US012705192B2

(12) United States Patent
Lee et al.

(10) Patent No.: US 12,705,192 B2
(45) Date of Patent: Aug. 11, 2026

(54) BANDWIDTH MANAGEMENT OF A SERIAL INTERFACE

(71) Applicant: Apple Inc., Cupertino, CA (US)

(72) Inventors: Inyeol Lee, Saratoga, CA (US); Henrik Icking, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/780,155

(22) Filed: Jul. 22, 2024

(65) Prior Publication Data

US 2026/0023698 A1 Jan. 22, 2026

(51) Int. Cl.
*G06F 13/16* (2006.01)
*G06F 13/42* (2006.01)

(52) U.S. Cl.
CPC ...... *G06F 13/1678* (2013.01); *G06F 13/4282* (2013.01); *G06F 2213/0056* (2013.01); *G06F 2213/0058* (2013.01)

(58) Field of Classification Search
None
See application file for complete search history.

(56) References Cited

U.S. PATENT DOCUMENTS 7,743,269 B2 6/2010 Marks et al.
7,934,032 B1 * 4/2011 Sardella .............. G06F 13/4022 710/316
8,615,587 B2 12/2013 Mehrotra et al.
9,355,058 B2 * 5/2016 Iyer ....................... G06F 1/3287
10,645,754 B2 5/2020 Talbert et al.
10,735,078 B2 8/2020 Ly et al.
10,846,247 B2 * 11/2020 Das Sharma ....... G06F 13/4282
(Continued)

FOREIGN PATENT DOCUMENTS

CN 115756941 A 3/2023
DE 102004042308 A1 3/2006
(Continued)

OTHER PUBLICATIONS

Machine Translation of Korean Patent Application KR-20110069655-A, 2011. (Year: 2011).*
(Continued)

*Primary Examiner* — Steven G Snyder
(74) *Attorney, Agent, or Firm* — Fletcher Yoder, P.C.

(57) ABSTRACT

This disclosure is directed to dynamic power management of a device interface based on a desired bandwidth for transporting data by the device interface. A device interface may packetize and transport raw data to a processor core complex or a peripheral device. In different embodiments, the peripheral device or the processor core complex may generate the raw data. The peripheral device and/or the processor core complex may increase or decrease a data bandwidth of the device interface for transporting the data. In different cases, the peripheral device or the processor core complex may dynamically activate and deactivate a different number of data links of the device interface based on dynamically determining the desired bandwidth. The peripheral device and/or the processor core complex may reduce a power consumption of the device interface by dynamically deactivating one or more of the data links based on the desired bandwidth being below the data bandwidth of the activated data links.

20 Claims, 10 Drawing Sheets

(56) References Cited

U.S. PATENT DOCUMENTS

| | | | | |
|---|---|---|---|---|
| 11,474,960 | B2 * | 10/2022 | Das Sharma | G06F 13/1678 |
| 11,909,850 | B1 | 2/2024 | Kochavi et al. | |
| 2006/0015761 | A1 | 1/2006 | Kwa et al. | |
| 2009/0187683 | A1 | 7/2009 | Adar et al. | |
| 2012/0066531 | A1 | 3/2012 | Shafai et al. | |
| 2014/0098893 | A1 * | 4/2014 | Ju | G06T 9/00 375/240.26 |
| 2014/0115207 | A1 * | 4/2014 | Iyer | G06F 13/1678 710/105 |
| 2014/0149775 | A1 | 5/2014 | Ware | |
| 2016/0103476 | A1 | 4/2016 | Kim et al. | |
| 2016/0378711 | A1 * | 12/2016 | Iyer | G06F 13/4291 710/307 |
| 2017/0116150 | A1 * | 4/2017 | Wiley | G06F 13/4282 |
| 2017/0212858 | A1 * | 7/2017 | Chu | G06F 13/4022 |
| 2021/0289443 | A1 | 9/2021 | Nam et al. | |
| 2022/0417809 | A1 | 12/2022 | Kneckt et al. | |
| 2023/0048504 | A1 * | 2/2023 | Seiler | G06F 13/362 |
| 2023/0125869 | A1 * | 4/2023 | Jung | G06F 12/0888 |
| 2023/0325342 | A1 | 10/2023 | Srivastava et al. | |
| 2023/0328648 | A1 | 10/2023 | Freda et al. | |
| 2024/0184353 | A1 | 6/2024 | Ware | |

FOREIGN PATENT DOCUMENTS

| | | | | |
|---|---|---|---|---|
| DE | 102020120784 A1 | | 2/2021 | |
| DE | 112013007770 B3 | | 4/2023 | |
| WO | WO-2016148859 A1 | * | 9/2016 | G09G 3/3607 |
| WO | WO-2021167590 A1 | * | 8/2021 | G06F 13/362 |

OTHER PUBLICATIONS

VESA, "VESA Embedded DisplayPort (eDP) Standard," Version 1.5a, Feb. 27, 2023, pp. 1-100.

VESA, "VESA Embedded DisplayPort (eDP) Standard," Version 1.5a, Feb. 27, 2023, pp. 101-250.

VESA, "VESA Embedded DisplayPort (eDP) Standard," Version 1.5a, Feb. 27, 2023, pp. 251-445.

* cited by examiner

BANDWIDTH MANAGEMENT OF A SERIAL INTERFACE

BACKGROUND

The present disclosure relates generally to managing bandwidth of an interface for transporting data.

An electronic device may include various components, such as one or more processor core complexes and/or peripheral devices coupled via a device interface. The peripheral devices may be disposed at a periphery of the electronic device to input and/or output data or an indication of the data. For example, the electronic device may include a camera, as a peripheral device, to capture frames of images and video. The device interface may transport at least a portion of the data generated by the peripheral device (e.g., the camera) to the processor core complex. The processor core complex may receive, analyze, and/or transmit the received data. Alternatively or additionally, the electronic device may include an electronic display, as a peripheral device, to display images based on receiving image data. The device interface may transport at least a portion of the image data from the processor core complex to the peripheral device (e.g., the electronic display). Systems and methods for improved bandwidth management and/or more efficient power consumption of the device interface transporting the data between the components is desired.

SUMMARY

The current disclosure is directed to a device interface of an electronic device with adjustable bandwidth for transporting data. The device interface may be coupled to a processor core complex and/or one or more peripheral devices of the electronic device. In some embodiments, the processor core complex may be coupled to a peripheral device via the device interface. For example, the processor core complex may be coupled to a controller and/or processing circuit of the peripheral device via the device interface. In alternative or additional embodiments, two or more processor core complexes of the electronic device may be coupled via the device interface. In some cases, a bandwidth of the device interface for transporting data may be dynamically adjustable during an operation of the electronic device.

In some embodiments, the electronic device may include one or more peripheral devices that may generate raw data for transmission. For example, a peripheral device may include a camera, among other possibilities. The device interface may include a transmitter for receiving, packetizing, and transmitting the raw data. The transmitter may include multiple transmission channels transmitting the data packets when activated. The device interface may also include a receiver for receiving and de-packetizing the data packets. The receiver may include multiple reception channels, each being coupled to a respective transmission channel. The receiver may determine and output payloads of one or more of the data packets to the processor core complex.

In alternative or additional embodiments, the processor core complex may provide (e.g., generate) raw data for transmission. As mentioned above, the device interface may include a transmitter for receiving, packetizing, and transmitting the raw data. Moreover, the transmitter may include multiple transmission channels transmitting the data packets when activated. The receiver of the device interface may receive and de-packetize the data packets. The receiver may determine and output payloads of one or more of the data packets to a peripheral device. For example, the peripheral device may include an electronic display, among other possibilities. The electronic display may display the received data (e.g., image data).

With the foregoing in mind, the peripheral device may dynamically activate and deactivate each of the transmission channels and the respective reception channels coupled thereto. The peripheral device may dynamically activate and deactivate the transmission channels and the reception channels based on dynamically determining a desired bandwidth for transporting the data packets to or from the processor core complex. For example, a transmitting device, such as the peripheral device or the processor core complex, may determine the desired bandwidth based on a data rate associated with providing (e.g., generating) the raw data by the transmitting device and a data rate of each of the transmission channels and the respective reception channels when activated. Moreover, the transmitting device may determine a data bandwidth of the device interface based on a number of currently activated transmission channels and reception channels.

The transmitting device may deactivate one or more of the transmission channels and the respective reception channels when the desired bandwidth is less than the data bandwidth. The transmitting device may activate one or more additional transmission channels and the respective reception channels when the desired bandwidth is higher than the data bandwidth. The transmitting device may dynamically and/or continuously (e.g., based on a time or triggering event) determine subsequent desired bandwidths and data bandwidths of the activated transmission channels and reception channels. In some embodiments, deactivating one or more of the transmission channels and/or reception channels may reduce a power consumption of the device interface. As such, the processor core complex (or one or more processors of the processor core complex) may dynamically reduce and/or increase the number of the transmission channels and/or the reception channels to adjust the power consumption of the device interface, and therefore the electronic device.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
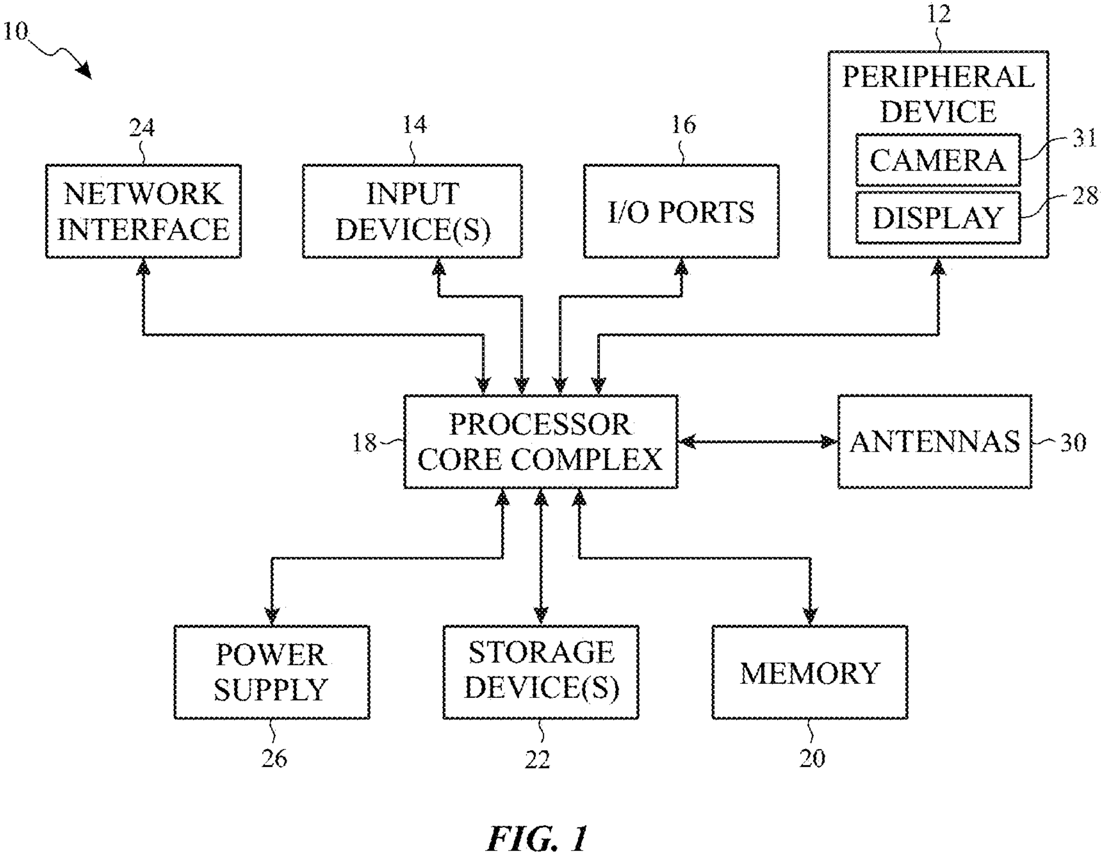
FIG. 1 is a block diagram of an electronic device including clock circuitry, according to embodiments of the present disclosure.

FIG. 1 is a block diagram of an electronic device 10 including a peripheral device 12, according to embodiments of the present disclosure. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the peripheral device 12, one or more input devices 14, one or more input/output (I/O) ports 16, a processor core complex 18 having one or more processing circuitry(s) or processing circuitry cores, local memory 20, a main memory storage device 22, a network interface 24, a power source 26 (e.g., power supply), an electronic display 28, one or more antennas 30, and a camera 31. The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

In some embodiments, the electronic device 10 may include two or more processor core complexes 18. The embodiments discussed herein may be associated with and/or similarly applicable to embodiments of the electronic device 10 including a single processor core complex 18 and embodiments of the electronic device 10 including two or more processor core complexes 18. For example, one or more of the processor core complexes 18 may include multiple cores including one or more processors, one or more controller, and/or one or more state machine circuits. Each of the two or more processor core complexes 18 may perform some functions or provide at least a portion of control signals and/or instructions discussed herein. In specific embodiments, some of the two or more processor core complexes 18 may be coupled together and may perform certain functions discussed herein individually or in collaboration with each other.

The processor core complex 18 is operably coupled with local memory 20 and the main memory storage device 22. Thus, the processor core complex 18 may execute instructions stored in local memory 20 and/or the main memory storage device 22 to perform operations, such as generating or transmitting image data to display on the electronic display 28 and/or receiving image data generated by the camera 31. As such, the processor core complex 18 may include one or more processors, one or more general purpose microprocessors, one or more application specific integrated circuits (ASICs), one or more field programmable logic arrays (FPGAs), or any combination thereof. In some embodiments, a system on a chip (SoC) may include the processor core complex 18, among other things.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network.

The power source 26 may provide electrical power to one or more components in the electronic device 10, such as the processor core complex 18, the electronic display 28, and/or the camera 31. For example, the power source 26 may include a power supply rail and/or a ground terminal coupled to the one or more components in the electronic device 10, such as the processor core complex 18, the electronic display 28, and/or the camera 31 to provide the electrical power. Thus, the power source 26 may include any suitable source of energy, such as a rechargeable lithium polymer (Li-poly) battery or an alternating current (AC) power converter.

The peripheral device 12 may include any viable periphery device such as the input devices 14, the memory 20 and/or the storage device 22, the electronic display 28, the antennas 30, the camera 31, a microphone, or any combination thereof, among other things. The peripheral device 12 may be coupled to and may communicate with the processor core complex 18 via a device interface. In some embodiments, the peripheral device 12 may generate and/or output instructions and/or controls signals to adjust a bandwidth of the device interface for data transmission. Moreover, the peripheral device 12 may generate and/or output (e.g., provide) raw data or image data. The peripheral device 12 may output the raw data or the image data to the processor core complex 18 via the device interface. For example, the camera 31 may capture images or frames of a video, and the peripheral device 12 and/or the camera 31 may output raw data based on the captured images or frames of the video.

In alternative or additional embodiments, the processor core complex 18 may generate and/or output the instructions and/or the controls signals to adjust the bandwidth of the device interface for data transmission. Moreover, the processor core complex 18 may generate and/or output (e.g., provide) raw data or image data. The processor core complex 18 may output the raw data or the image data to the peripheral device 12 via the device interface. For example, the display 28 may receive and/or display the raw data or the image data.

The I/O ports 16 may enable the electronic device 10 to interface with other electronic devices. For example, when a portable storage device is connected, the I/O port 16 may enable the processor core complex 18 to communicate data with the portable storage device. The input devices 14 may enable user interaction with the electronic device 10, for example, by receiving user inputs via a button, a keyboard, a mouse, a trackpad, or the like. The input device 14 may include touch-sensing components in the electronic display 28. The touch sensing components may receive user inputs by detecting occurrence or position of an object touching the surface of the electronic display 28.

The electronic display 28 may include driver circuitry (e.g., display driver circuitry) and/or a display panel including pixel circuitry with an array of display pixels. Moreover, the driver circuitry may include various circuitry to provide one or more stable positive and/or negative supply voltages, such as the power supply rail and/or the ground terminal. Image data for display on the electronic display 28 may be generated by an image source, such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 28 may display frames based on image data generated by the processor core complex 18, or the electronic display 28 may display frames based on image data received via the network interface 24, an input device, or an I/O port 16.

Figures 2, 3:
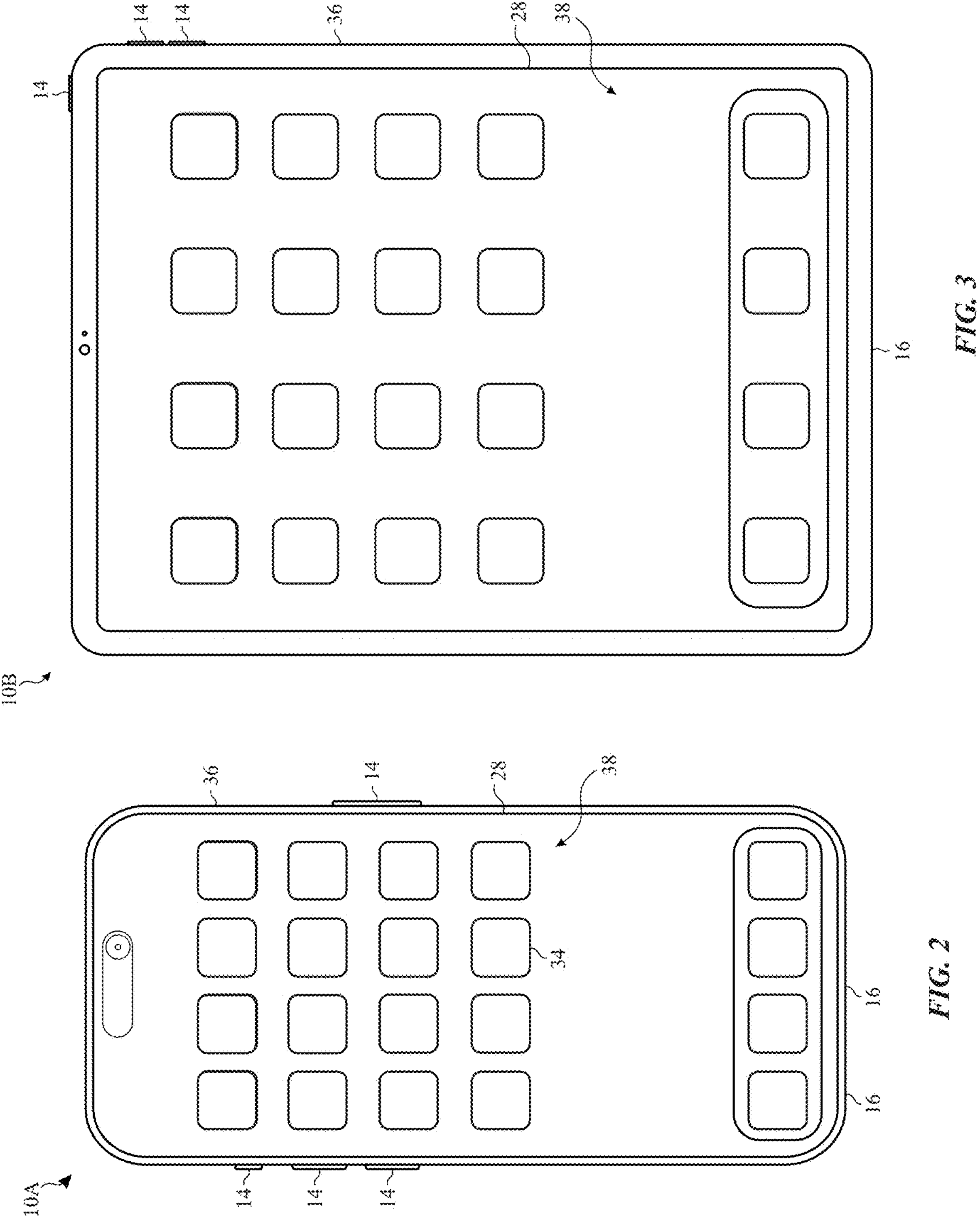
FIG. 2 is a front view of a handheld device representing an example of the electronic device of FIG. 1, according to embodiments of the present disclosure.
FIG. 3 is a front view of another handheld device representing another example of the electronic device of FIG. 1, according to embodiments of the present disclosure.

The electronic device 10 may also have the one or more antennas 30 electrically coupled to the processor core complex 18. The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 36 (e.g., housing). The enclosure 36 may protect interior components from physical damage or shield them from electromagnetic interference, such as by surrounding the electronic display 28. The electronic display 28 may display a graphical user interface (GUI) 38 having an array of icons. When an icon 34 is selected either by an input device 14 or a touch-sensing component of the electronic display 28, an application program may launch.

The input devices 14 may be accessed through openings in the enclosure 36. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 4:
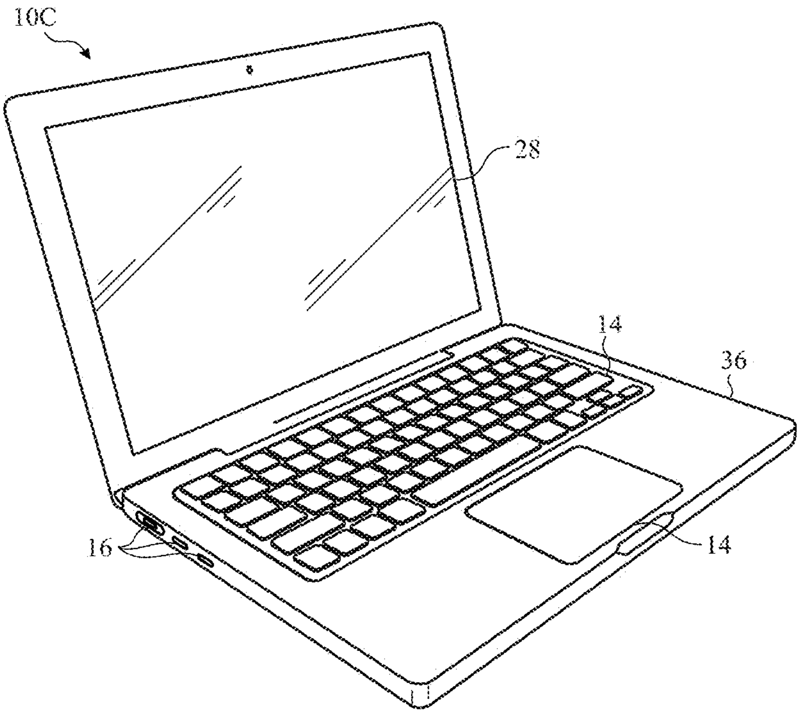
FIG. 4 is a perspective view of a notebook computer representing an example of the electronic device of FIG. 1, according to embodiments of the present disclosure.
Figure 5:
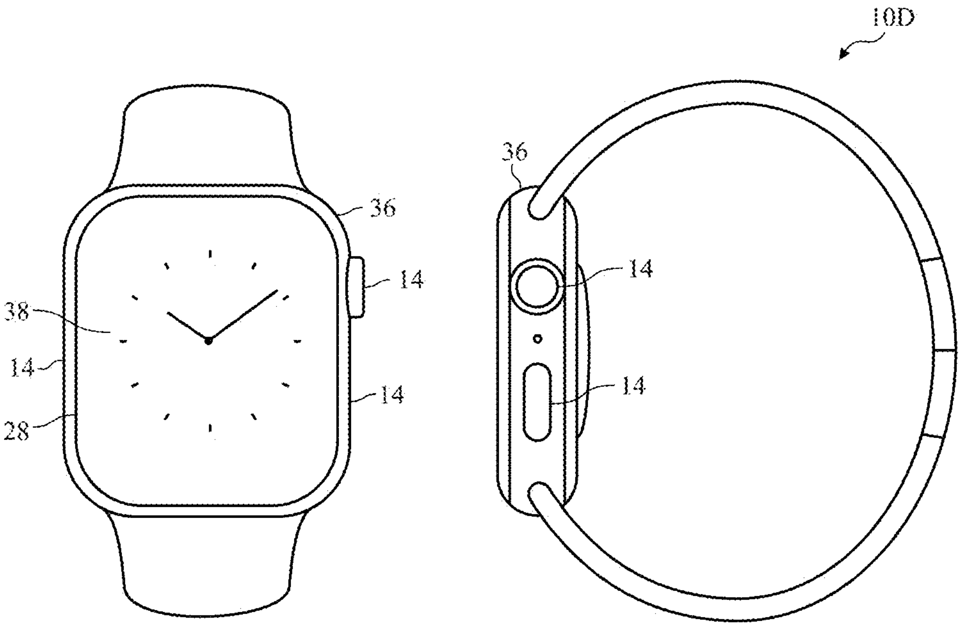
FIG. 5 illustrates front and side views of a wearable electronic device representing another example of the electronic device of FIG. 1, according to embodiments of the present disclosure.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc.

As depicted, the tablet device 10B, the computer 10C, and the watch 10D each also includes an electronic display 28, input devices 14, I/O ports 16, and an enclosure 36. The electronic display 28 may display a GUI 38. As shown in FIG. 5, the GUI 38 may show a visualization of a clock. When the visualization is selected either by the input device 14 or a touch-sensing component of the electronic display 28, an application program may launch, such as to transition the GUI 38 to presenting the icons 34 discussed with respect to FIGS. 2 and 3.

Figure 6:
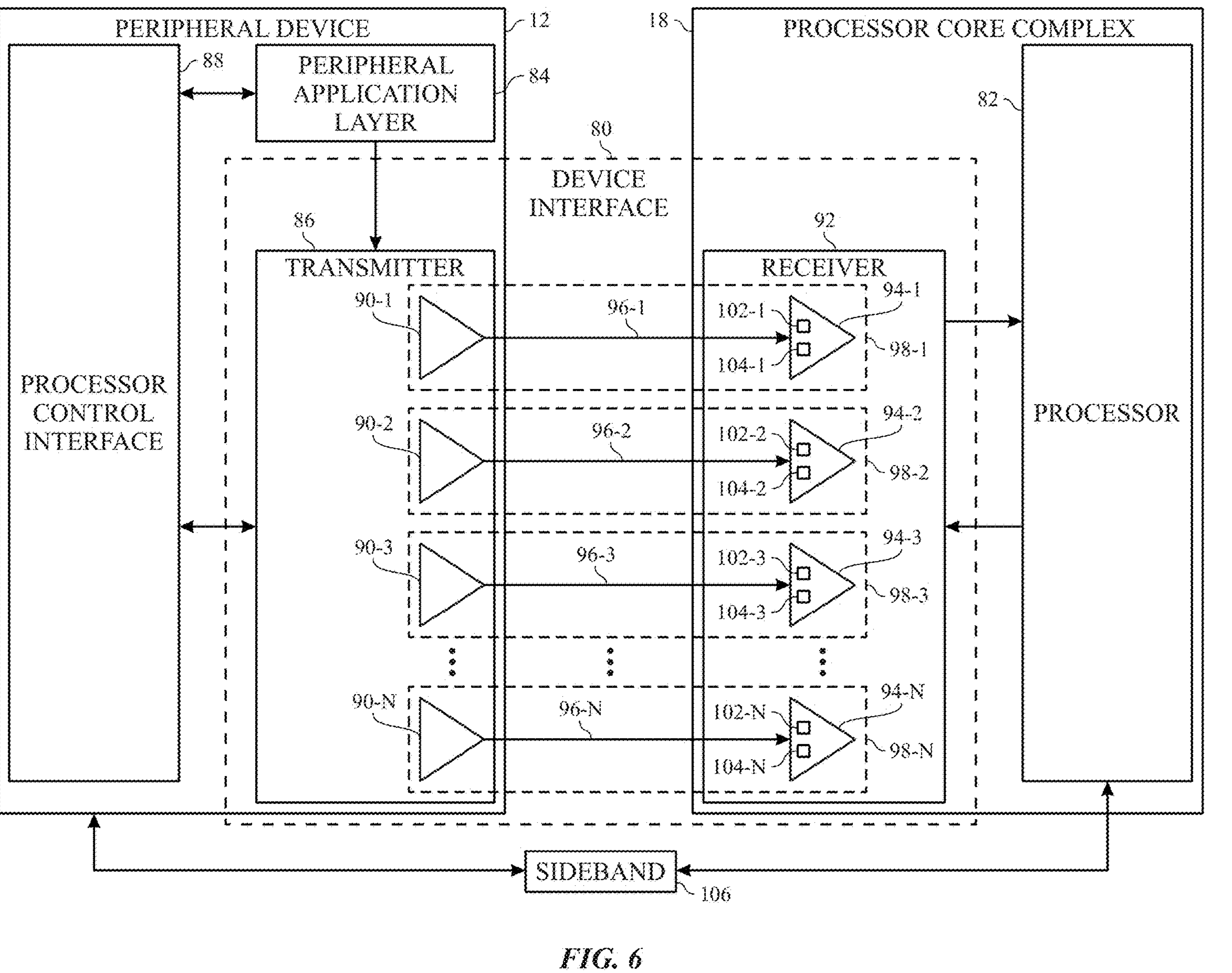
FIG. 6 is a block diagram of a device interface disposed on a peripheral device and a processor core complex of the electronic devices of FIGS. 1-5, where the peripheral device transmits data, according to embodiments of the present disclosure.

FIG. 6 is a first block diagram of a device interface 80 disposed on the peripheral device 12 and the processor core complex 18 of the electronic device 10, according to embodiments of the present disclosure. The device interface 80 may include circuitry for packet-based serial data communication between the peripheral device 12 and at least one processor 82 of the processor core complex 18. In some embodiments, the processor core complex 18 may include a single processor (e.g., the processor 82). In alternative or additional embodiments, the processor core complex 18 may include multiple processors, controller circuitry, and/or state machine circuitry including the processor 82. In specific embodiments, two or more processor core complexes 18 may be coupled to the peripheral device 12. For example, in some cases, one or more of the processor core complexes 18 may include the processor 82 and/or perform a portion of the operations associated with the processor 82.

The device interface 80 may provide a data communication link between the peripheral device 12 and the processor core complex 18. In the depicted embodiment, the peripheral device 12 may generate peripheral device data (e.g., raw data associated with the peripheral device, image data) for transmission. The device interface 80 may receive, packetize, and transport the received data to the processor 82. Moreover, the peripheral device 12 may adjust the data bandwidth and a power consumption of the device interface 80.

The peripheral device 12 may include a peripheral application layer 84, a transmitter 86, and a processor control interface 88. The peripheral application layer 84 may be coupled to the transmitter 86. The processor control interface 88 may be coupled to the peripheral application layer 84, the transmitter 86, and the processor 82 of the processor core complex 18.

The peripheral device 12 may include components and/or circuitry, such as a controller and/or a processing circuit (not shown for simplicity), to generate the raw data. The peripheral application layer 84 may output the raw data to the transmitter 86. By way of example, the peripheral device 12 may include the camera 31 (mentioned above) capturing images or frames of a video, and the peripheral application layer 84 may generate and/or output the raw data based on the captured images or frames of the video. Alternatively or additionally, the peripheral device 12 may include any other viable device to receive (e.g., capture) and/or generate the raw data.

The transmitter 86 may include circuitry to packetize and/or encode the raw data. Moreover, the transmitter 86 may include multiple transmission channels 90 (e.g., transmission channels 90-1 to 90-N) for outputting the data packets. In some embodiments, each transmission channel 90 may include an amplification circuit to transmit data. For example, the transmission channel 90 may include one or more amplifiers and/or driver circuitry, among other things. The transmitter 86 may also include circuitry to distribute a data packet or a stream of multiple data packets between one or multiple active transmission channels 90 of the transmission channels 90-1 to 90-N for transmission.

In some embodiments, the transmission channels 90 may become activated to provide a total bandwidth for data transmission upon switching on the transmitter 86 from an off state. The processor 82 may generate instructions to switch on the transmitter 86. The transmitter 86 may switch on to activate the transmission channels 90-1 to 90-N based on the instructions. Moreover, the peripheral device 12 may dynamically adjust a number of the active transmission channels 90 based on a desired bandwidth for transmitting the data packets. For example, in some cases, the peripheral device 12 may deactivate one or more of the active transmission channels 90 to reduce a power consumption of the device interface 80 based on the desired bandwidth being lower than the total bandwidth.

The deactivated transmission channels 90 may not transmit data. In some cases, a deactivated transmission channel 90 may maintain (e.g., hold) a common-mode voltage (e.g., a direct current (DC) signal) at an output of the respective transmission channel 90 without transmitting data. Alternatively or additionally, an output voltage of the transmission channels 90-1 to 90-N may be zero, near zero, at a ground voltage of the electronic device 10 (e.g., a virtual zero voltage), near the ground voltage, or any other viable voltage level. The output impedance at the output of the transmission channels may be higher than a threshold. For example, the deactivated transmission channels 90 may have a higher output impedance compared to an output impedance of the activated transmission channels 90.

In some embodiments, the processor control interface 88 may provide indications (e.g., control signals) to the peripheral application layer 84 and/or the transmitter 86 to adjust operations of the peripheral device 12 and/or the device interface 80. The processor control interface 88 may provide the indications based on receiving the instructions from the processor 82. For example, the processor control interface 88 may include configuration registers.

In some cases, the configuration registers may store values indicative of an on or an off state of the transmitter 86 and/or at least a portion or component of the peripheral device 12. Alternatively or additionally, the configuration registers may store values indicative of an active state or a sleep state of one or more of the transmission channels 90. In specific embodiments, the peripheral device 12 may set or reset a stored value of one or more of the configuration registers of the processor control interface 88 to correspond to a state (e.g., active state, deactivated state) of one or more of the data links 98. In such embodiments, the peripheral device 12 may indicate the active state or the deactivated state of one or more of the data links 98 to the processor 82.

With the foregoing in mind, the processor core complex 18 may include the processor 82 and a receiver 92. In some embodiments, the processor core complex 18 may include a system-on-chip (SoC) including the processor 82 and the receiver 92. For example, the SoC may include additional circuits and/or components not shown in FIG. 6 for simplicity.

The processor 82 may be coupled to the receiver 92. The receiver 92 may include multiple reception channels 94 (e.g., reception channels 94-1 to 94-N) to receive the data packets. Each reception channel 94 may be coupled to a respective transmission channel 90 of the transmitter 86 via a respective data lane 96. The device interface 80 may include the transmitter 86, the receiver 92, and the data lanes 96. As such, the device interface 80 may be disposed on and/or between the peripheral device 12 and the processor core complex 18 to provide the data communication link.

In some embodiments, each reception channel 94 may include a high-frequency data receiver 102 and a low-frequency data receiver 104. The high-frequency data receiver 102 may receive data at a higher frequency than data received by the low-frequency data receiver 104. By way of example, the high-frequency data receiver 102 may include circuitry to receive data having a clock frequency equal to or above 0.1 giga Hertz (GHz), 0.2 GHz, 0.52 GHz, 0.81 GHz, 1.1 GHz, 2.3 GHz, 4.8 GHz, 6.75 GHz, 8 GHz, and so on, among other possibilities. In some cases, each high-frequency data receiver 102 may receive the data packet or the stream of multiple data packets from the respective transmission channel 90 when the respective reception channel 94 is activated. For example, each high-frequency data receiver 102 may receive the link training data sequences and/or the wakeup data sequences from the respective transmission channel 90 when the respective reception channel 94 is activated or deactivated (e.g., but not off). Moreover, the low-frequency data receiver 104 may include circuitry to receive data having a clock frequency equal to or below 10 mega Hertz (MHz), 20 MHz, 40 MHz, 42 MHz, 54 MHz, and so on, among other possibilities. Each low-frequency data receiver 104 may receive the link wakeup data sequences from the respective transmission channel 90 when the respective reception channel 94 is deactivated (e.g., but not off).

In some embodiments, the peripheral device 12 (e.g., the transmitter 86), the processor 82, or any other viable circuitry may activate each respective reception channel 94 by switching on the respective high-frequency data receiver 102 and deactivate each respective reception channel 94 by switching off the respective high-frequency data receiver 102. Alternatively or additionally, the peripheral device 12 (e.g., the transmitter 86), the processor 82, or any other viable circuitry may switch off the low-frequency data receiver 104 when activating a reception channel 94, and switch on the low-frequency data receiver 104, when deactivating reception channels 94.

The receiver 92 may also include circuitry to de-packetize and/or decode the received data packets and/or various data sequences. In some cases, the receiver 92 may include circuitry to remove at least a portion of the received data packets and/or packet overheads to determine payloads (e.g., desired data) of the received data packets. For example, the packet overheads may include various symbols such as packet headers and/or End-of-Packet indicators, among other things. The receiver 92 may output the payloads (or the received data packet or the received stream of multiple data packets) to the processor 82.

Each transmission channel 90 may be coupled to the respective reception channel 94 via the respective data lane 96 to form a respective data link 98 (e.g., data links 98-1 to 98-N). The peripheral device 12 may switch off, switch on, activate, and deactivate the data links 98 including the respective transmission channels 90 and reception channels 94. The total bandwidth of the device interface 80 may be determined based on a total number of the data links 98, a data transmission rate of each of the data links 98, and a communication protocol for packetizing, encoding, and transporting the payloads via the data links 98. The payloads may include the raw data and/or the desired data.

In some cases, the data links 98 (e.g., the entirety of the data links 98-1 to 98-N) may become activated to provide the total bandwidth for data transmission. In different cases, the peripheral device 12 may adjust the number of the active data links 98 based on the desired bandwidth for transmitting the data packets via the device interface 80. For example, the peripheral device 12 may generate a different amount of raw data at different times. Moreover, the peripheral device 12 may continuously determine and/or monitor the desired bandwidth based on the amount of raw data being generated. As such, the peripheral device 12 may dynamically adjust the number of the active data links 98 based on continuously determining and/or monitoring the desired bandwidth for transmitting the data packets.

As mentioned above, the peripheral device 12 may reduce the power consumption of the device interface 80 by deactivating one or more of the transmission channels 90. Moreover, the one or more transmission channels 90 may deactivate one or more respective reception channels 94 coupled thereto in response to receiving the instructions and/or the indications (e.g., the control signals) and before becoming deactivated. For example, the transmission channels 90 may transition to the sleep state by transmitting one or more sleep data sequences to deactivate the respective reception channels 94 coupled thereto. Accordingly, the peripheral device 12 may output the instructions (e.g., control signals) to deactivate one or more of the data links 98 including the one or more transmission channels 90 and the respective reception channels 94. It should be appreciated that the peripheral device 12 may output the instructions and/or the indications (e.g., control signals) to the transmitter 86 directly or via any other viable circuitry.

In some embodiments, each high-frequency data receiver 102 of a reception channel 94 may consume higher electrical power compared to a respective low-frequency data receiver 104 when activated. Moreover, the receiver 92 may deactivate one or more of the reception channels 94 based on receiving the sleep data sequences. As such, the receiver 92 may deactivate the one or more reception channels 94 by turning off the high-frequency data receivers 102 of the one or more reception channels 94. In some cases, the low-frequency data receivers 104 may remain active when the one or more reception channels 94 are deactivated. Each low-frequency data receiver 104 may receive subsequent instructions (e.g., a wakeup data sequence) to activate a respective high-frequency data receiver 102 (or to return the respective high-frequency data receiver 102 to the activated state).

Accordingly, the peripheral device 12 may deactivate a number of the data links 98 to reduce the data bandwidth and/or the power consumption of the device interface 80 and/or the electronic device 10. The peripheral device 12 may deactivate the one or more data links 98 based on determining that the amount of data and/or data packets for transport corresponds to a desired bandwidth lower than the data bandwidth of the device interface 80. Moreover, the peripheral device 12 may activate one or more additional data links 98 to increase the data bandwidth of the device interface 80. The peripheral device 12 may activate the one or more additional data links 98 based on determining that the amount of data and/or data packets for transport corresponds to a desired bandwidth higher than the data bandwidth of the device interface 80.

In some embodiments, one or more of the transmission channels 90 may transmit an indication of a number of the reception channels 94 to become activated. In some cases, one or more of the transmission channels 90 may transport the indication with a data packet before transmitting a sleep data sequence to transition all or some of the reception channels 94 to the sleep state. Alternatively or additionally, one or more of the transmission channels 90 may transport the indication with (e.g., within, as part of) the sleep data sequence. For example, all of the data links 98 may transition to the sleep state after the one or more transmission channels 90 transmits the indication with a data packet or with the sleep data sequence. Moreover, the receiver 92 may receive and/or store the number of the reception channels 94 to become activated upon receiving a subsequent wakeup data sequence by any of the reception channels 94. In specific cases, alternatively or additionally, one or more of the transmission channels 90 may transport the indication with (e.g., within, as part of) the wakeup data sequence. The receiver 92 may activate the number of the reception channels 94 upon receiving the subsequent wakeup data sequence by any of the reception channels 94. The transmitter 86 and the receiver 92 may activate and deactivate the transmission channels 90 and the corresponding reception channels 94 based on a predetermined order.

In alternative or additional cases, one or more of the transmission channels 90 may transport the indication with a data packet to a respective reception channel 94 while at least one data link 98 remains activated after transmitting the indication. For example, a transmission channel 90 may transport the data packet to a respective reception channel 94 while the transmission channel 90 or at least one other transmission channel 90 remains activated after the indication is transmitted. In specific cases, the receiver 92 may receive and/or store the number of the reception channels 94 to become activated upon receiving a subsequent wakeup data sequence by any of the reception channels 94. Alternatively or additionally, the receiver 92 may activate the number of the reception channels 94 upon receiving the data packet and/or receiving the subsequent wakeup data sequence by any of the reception channels 94. As mentioned above, the transmitter 86 and the receiver 92 may activate and deactivate the transmission channels 90 and the corresponding reception channels 94 based on a predetermined order.

In some embodiments, the electronic device 10 may include a sideband channel 106 coupled to the peripheral device 12 and the processor 82 and/or the processor core complex 18. The sideband channel 106 may include circuitry and/or components for sideband signaling between the peripheral device 12 and the processor 82. As such, in some cases, the peripheral device 12 may use the sideband channel 106 to transmit the indication of the number of the reception channels 94 to become activated or deactivated to the receiver 92. In different cases, all of the reception channels 94 may transition to the sleep state or one or more of the reception channels 94 may remain at the active state after the peripheral device 12 transmits the indication of the number of the reception channels 94 to the receiver 92 via the sideband channel 106. Moreover, as mentioned above, the peripheral device 12 may set or reset a stored value of one or more of the configuration registers of the processor control interface 88 to correspond to a state (e.g., active state, deactivated state) of one or more of the data links 98. In specific embodiments, the peripheral device 12 may indicate the active state or the deactivated state of one or more of the data links 98 to the processor 82 by transmitting one or more control packets via the sideband channel 106.

With the foregoing in mind, a number of the transmission channels 90, corresponding to the number of the reception channels 94, may transition to the active state. One or more of the transmission channels 90 may transmit one or more wakeup data sequences when the number of the transmission channels 90 is being activated. The receiver 92 may receive the wakeup data sequences via the low-frequency data receiver 104 of one or more reception channels 94 corresponding to the one or more transmission channels 90.

The receiver 92 may activate the high-frequency data receiver 102 of the number of the reception channels 94 based on the previously received indication and/or data packet and upon receiving the wakeup data sequences. For example, the receiver 92 may activate the high-frequency data receiver 102 of each reception channel 94 that is coupled to a respective transmission channel 90 being activated. As such, the peripheral device 12 may output the instructions to activate one or more of the data links 98 including the one or more transmission channels 90 and the one or more reception channels 94.

Figure 7:
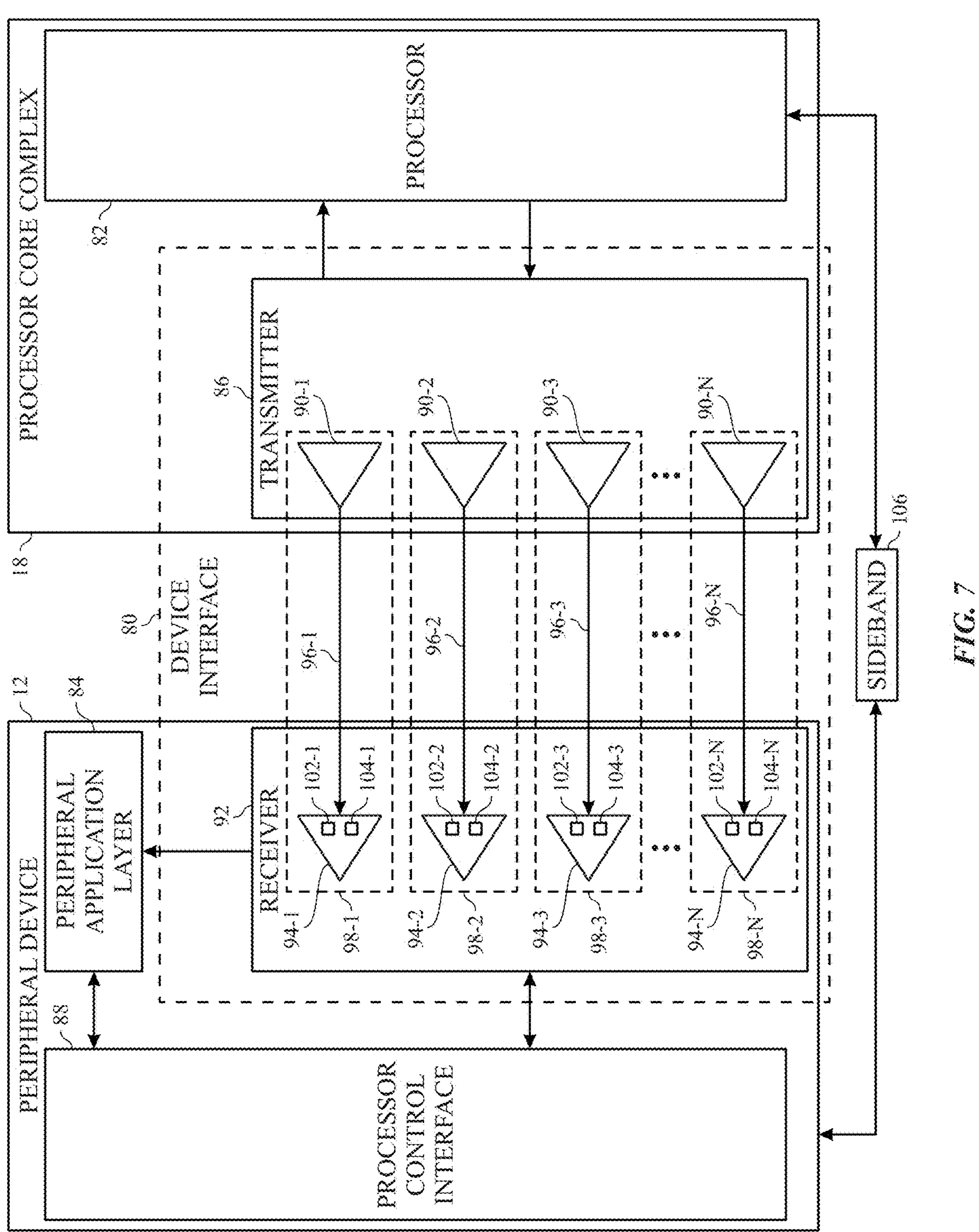
FIG. 7 is a block diagram of the device interface disposed on the peripheral device and the processor core complex of the electronic devices of FIGS. 1-5, where a processor of the processor core complex transmits data, according to embodiments of the present disclosure.

FIG. 7 is a second block diagram of the device interface 80 disposed on the peripheral device 12 and the processor core complex 18 of the electronic device 10, according to embodiments of the present disclosure. As discussed above, the device interface 80 may provide a data communication link between the peripheral device 12 and the processor 82 based on including circuitry for packet-based serial data communication. The device interface 80 may include the transmitter 86, the receiver 92, and the data lanes 96 to provide the data communication link. In the depicted embodiment, the processor 82 may generate raw data or image data for transmission. The device interface 80 may receive, packetize, and transport the received data to the peripheral device 12. Moreover, the processor 82 may adjust the data bandwidth and a power consumption of the device interface 80.

In some embodiments, the processor core complex 18 may include a SoC including the processor 82 and the transmitter 86. For example, the SoC may include additional circuits and/or components not shown in FIG. 7 for simplicity. Moreover, the peripheral device 12 may include the peripheral application layer 84, the receiver 92, and the processor control interface 88. The peripheral application layer 84 may be coupled to the receiver 92. The processor control interface 88 may be coupled to the peripheral application layer 84, the receiver 92, and the processor 82 of the processor core complex 18.

Referring now to the processor core complex 18, the processor 82 may be coupled to the transmitter 86. The transmitter 86 may receive the raw data or the image data from the processor 82. The transmitter 86 may include circuitry to packetize and/or encode the raw data or the image data. The transmitter 86 may include the transmission channels 90 (e.g., transmission channels 90-1 to 90-N) for outputting the data packets. In some embodiments, the transmitter 86 may distribute a data packet or a stream of multiple data packets between one or multiple active transmission channels 90 of the transmission channels 90-1 to 90-N for transmission.

The processor 82 may generate instructions to switch on the transmitter 86. The transmitter 86 may switch on to activate the transmission channels 90-1 to 90-N based on the instructions. Upon switching on the transmitter 86 from an off state, the transmission channels 90-1 to 90-N may become activated to provide a total bandwidth for data transmission. The processor 82 may generate instructions to dynamically adjust the number of the active transmission channels 90 based on a desired bandwidth for transmitting the data packets. For example, in some cases, the processor 82 may deactivate one or more of the active transmission channels 90 to reduce a power consumption of the device interface 80 based on the desired bandwidth being lower than the total bandwidth.

As discussed above, in some cases, the deactivated transmission channels 90 may not transmit data. In specific cases, a deactivated transmission channel 90 may maintain (e.g., hold) a common-mode voltage (e.g., a DC signal) at an output of the respective transmission channel 90 without transmitting data. In alternative or additional cases, an output voltage of the transmission channels 90-1 to 90-N may be zero, near zero, at a ground voltage of the electronic device 10 (e.g., a virtual zero voltage), near the ground voltage, or any other viable voltage level. The output impedance at the output of the transmission channels may be higher than a threshold. For example, the deactivated transmission channels 90 may have a higher output impedance compared to an output impedance of the activated transmission channels 90.

The receiver 92 may include the reception channels 94 (e.g., the reception channels 94-1 to 94-N) to receive the data packets. The receiver 92 may also include circuitry to de-packetize and/or decode the received data packets and/or various data sequences. As mentioned above, in some cases, the receiver 92 may include circuitry to remove at least a portion of the received data packets and/or packet overheads to determine payloads (e.g., desired data) of the received data packets. The receiver 92 may output the payloads (or the received data packet or the received stream of multiple data packets) to the peripheral application layer 84.

Each transmission channel 90 may be coupled to a respective reception channel 94 via a respective data lane 96 to form a respective data link 98 (e.g., data links 98-1 to 98-N). The processor 82 may switch off, switch on, activate, and deactivate the data links 98 including the respective transmission channels 90 and reception channels 94. Moreover, the total bandwidth of the device interface 80 may be determined based on a total number of the data links 98, a data transmission rate of each of the data links 98, and a communication protocol for packetizing, encoding, and transporting the payloads, including the raw data and/or the desired data, via the data links 98.

In some cases, the data links 98 (e.g., the entirety of the data links 98-1 to 98-N) may become activated to provide the total bandwidth for data transmission. In different cases, the processor 82 may adjust the number of the active data links 98 based on the desired bandwidth for transmitting the data packets via the device interface 80. For example, the processor 82 may generate and/or provide a different amount of raw data at different times. Moreover, the processor 82 may continuously determine and/or monitor the desired bandwidth based on the amount of raw data being generated. As such, the processor 82 may dynamically adjust the number of the active data links 98 based on continuously determining and/or monitoring the desired bandwidth for transmitting the data packets.

As such, the processor 82 may reduce the bandwidth of the device interface 80 by deactivating one or more of the transmission channels 90. Moreover, the one or more transmission channels 90 may deactivate one or more respective reception channels 94 coupled thereto in response to receiving the instructions and/or the indications (e.g., the control signals) and before becoming deactivated. For example, the transmission channels 90 may transition to the sleep state by transmitting one or more sleep data sequences to deactivate the respective reception channels 94 coupled thereto. Accordingly, the processor 82 may output the instructions (or control signals) to deactivate one or more of the data links 98 including the one or more transmission channels 90 and the respective reception channels 94.

As discussed above, each reception channel 94 may include a respective high-frequency data receiver 102 and a low-frequency data receiver 104. Moreover, each high-frequency data receiver 102 may receive data at a higher frequency compared to a respective low-frequency data receiver 104 when activated. In some cases, each high-frequency data receiver 102 may receive the data packet or the stream of multiple data packets from the respective transmission channel 90 when the respective reception channel 94 is activated. The receiver 92 may deactivate one or more of the reception channels 94 based on receiving the sleep data sequences.

As such, the receiver 92 may deactivate the one or more of the reception channels 94 by turning off the high-frequency data receivers 102 of the one or more reception channels 94. In some cases, the low-frequency data receivers 104 may remain active when the one or more reception channels 94 are deactivated. As such, each low-frequency data receiver 104 may receive subsequent instructions (e.g., a wakeup data sequence) to activate a respective high-frequency data receiver 102 (or to return the respective high-frequency data receiver 102 to the activated state). Accordingly, processor 82 may reduce a power consumption of the receiver 92 and the device interface 80 based on deactivating one or more of the data links 98. The processor 82 may deactivate one or more of the data links 98 to reduce the data bandwidth and/or a power consumption of the device interface 80 and/or the electronic device 10.

As discussed above, the processor 82 may deactivate the one or more data links 98 based on determining that the amount of data and/or data packets for transport corresponds to a desired bandwidth lower than the data bandwidth of the device interface 80. Moreover, the processor 82 may activate the one or more additional data links 98 based on determining that the amount of data and/or data packets for transport corresponds to a desired bandwidth higher than the data bandwidth of the device interface 80. As such, the processor 82 may activate one or more additional data links 98 to increase the data bandwidth of the device interface 80. The processor 82 may output the instructions and/or the indications (e.g., control signals) to the transmitter 86 directly or via any other viable circuitry.

In some embodiments, one or more of the transmission channels 90 may transmit an indication of a number of the reception channels 94 to become activated. In some cases, one or more of the transmission channels 90 may transport the indication with a data packet before transmitting the sleep data sequences to transition all or some of the reception channels 94 to the sleep state. Alternatively or additionally, one or more of the transmission channels 90 may transport the indication with (e.g., within, as part of) the sleep data sequence. For example, all of the data links 98 may transition to the sleep state after the one or more transmission channels 90 transmits the indication with a data packet or with the sleep data sequence.

Moreover, the receiver 92 may receive and/or store the number of the reception channels 94 to become activated. In specific cases, alternatively or additionally, one or more of the transmission channels 90 may transport the indication with (e.g., within, as part of) the wakeup data sequence. Alternatively or additionally, the one or more of the transmission channels 90 may transport the indication before or after transitioning the reception channels 94 to the sleep state by transmitting a designated data packet or using a sideband channel 106. The receiver 92 may activate the indicated number of the reception channels 94 upon receiving a subsequent wakeup data sequence by any of the reception channels 94. The transmitter 86 and the receiver 92 may activate and deactivate the transmission channels 90 and the corresponding reception channels 94 based on a predetermined order.

In alternative or additional cases, one or more of the transmission channels 90 may transport the indication with a data packet to a respective reception channel 94 while at least one data link 98 remains activated after transmitting the indication. For example, a transmission channel 90 may transport the data packet to a respective reception channel 94 while the transmission channel 90 or at least one other transmission channel 90 remains activated after the indication is transmitted.

In specific cases, the receiver 92 may receive and/or store the number of the reception channels 94 to become activated. The receiver 92 may activate the number of the reception channels 94 upon receiving a subsequent wakeup data sequence by any of the reception channels 94. Alternatively or additionally, the receiver 92 may activate the number of the reception channels 94 upon receiving the data packet and/or receiving the subsequent wakeup data sequence by any of the reception channels 94. As mentioned above, the transmitter 86 and the receiver 92 may activate and deactivate the transmission channels 90 and the corresponding reception channels 94 based on a predetermined order.

In some embodiments, the electronic device 10 may include the sideband channel 106 coupled to the peripheral device 12 and the processor 82 and/or the processor core complex 18. The sideband channel 106 may include circuitry and/or components for sideband signaling between the peripheral device 12 and the processor 82. As such, in some cases, the processor 82 may use the sideband channel 106 to transmit the indication of the number of the reception channels 94 to become activated to the receiver 92. In different cases, all of the reception channels 94 may transition to the sleep state or one or more of the reception channels 94 may remain at the active state after the processor 82 transmits the indication of the number of the reception channels 94 to the receiver 92 via the sideband channel 106.

With the foregoing in mind, a number of the transmission channels 90, corresponding to the number of the reception channels 94, may transition to the active state. One or more of the transmission channels 90 may transmit one or more wakeup data sequences when the number of the transmission channels 90 is being activated. The receiver 92 may receive the wakeup data sequences via the low-frequency data receiver 104 of one or more reception channels 94 corresponding to the one or more transmission channels 90.

The receiver 92 may activate the high-frequency data receiver 102 of the number of the reception channels 94 based on the previously received indication and/or data packet and upon receiving the wakeup data sequences. For example, the receiver 92 may activate the high-frequency data receiver 102 of each reception channel 94 that is coupled to a respective transmission channel 90 being activated. As such, the processor 82 may output the instructions to activate one or more of the data links 98 including the one or more transmission channels 90 and the one or more reception channels 94.

The peripheral application layer 84 may receive the payloads from the receiver 92. The peripheral device 12 may include components and/or circuitry to perform one or more operations based on receiving the payloads. By way of example, the peripheral device 12 may include the electronic display 28 (discussed above) displaying images or frames of a video. Moreover, the peripheral application layer 84 may generate and/or output the image data (or processed image data) to various components (e.g., pixels) of the electronic display 28 to display the images or the frames of the video. Alternatively or additionally, the peripheral device 12 may include any other viable device and may perform any other viable operation based on receiving the payloads.

In some embodiments, the processor control interface 88 may receive indications (e.g., control signals) from the processor 82 to adjust operations of the peripheral application layer 84 and/or the device interface 80. As discussed above, the processor control interface 88 may include configuration registers to store values indicative of the received indications. The processor control interface 88 may provide the indications to the peripheral application layer 84 and/or the receiver 92. For example, the processor control interface 88 may provide the indications to switch one or more components of the peripheral device 12 and/or the receiver 92 on and off and/or activate and deactivate one or more of the transmission channels 90.

Figure 8:
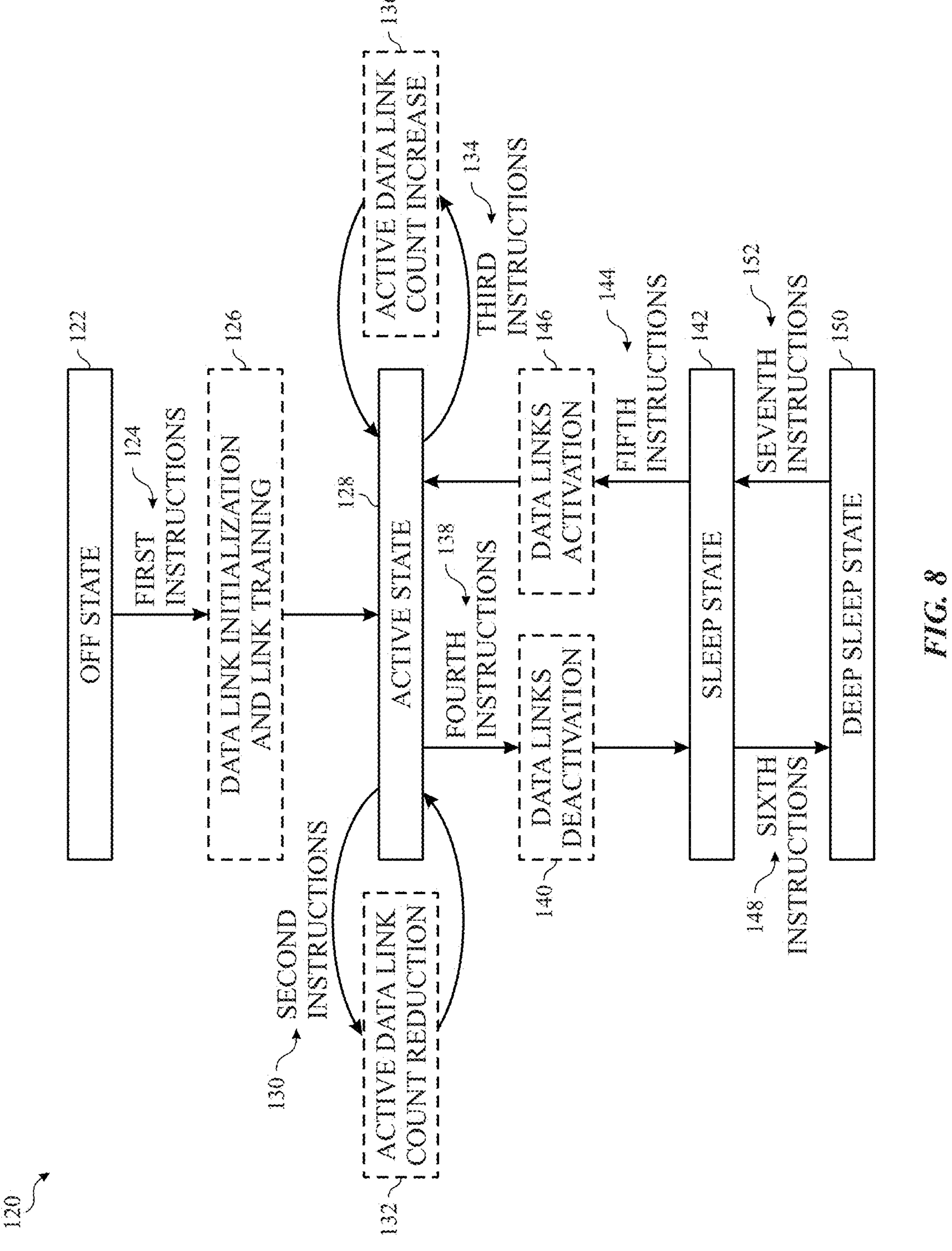
FIG. 8 is a flowchart of a state diagram for adjusting the bandwidth and power consumption of the device interface of FIG. 6, according to embodiments of the present disclosure.
Figure 9:
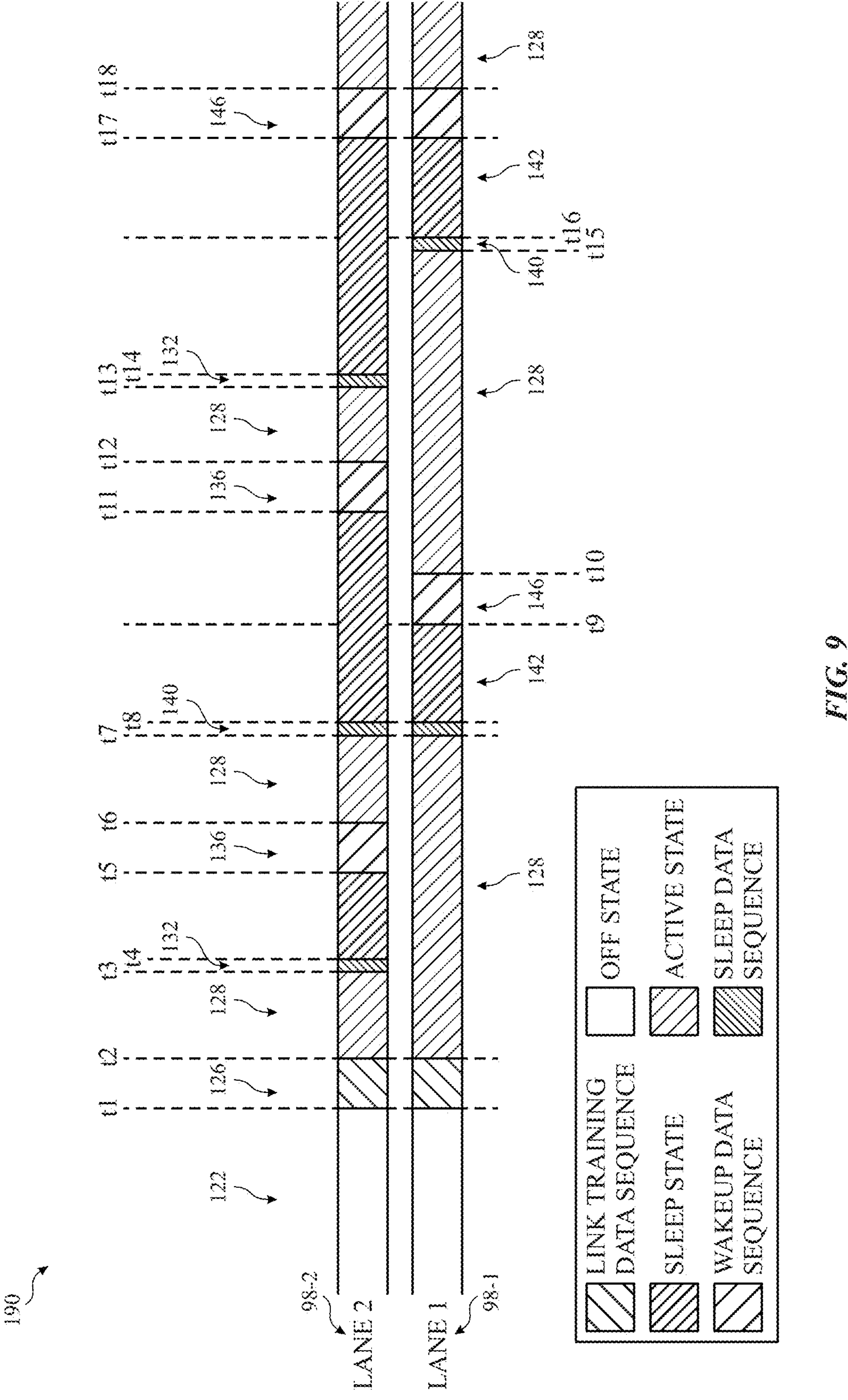
FIG. 9 is a data sequence diagram illustrating per-lane power management of a first data link and a second data link of the device interface of FIG. 6, according to embodiments of the present disclosure.
Figure 10:
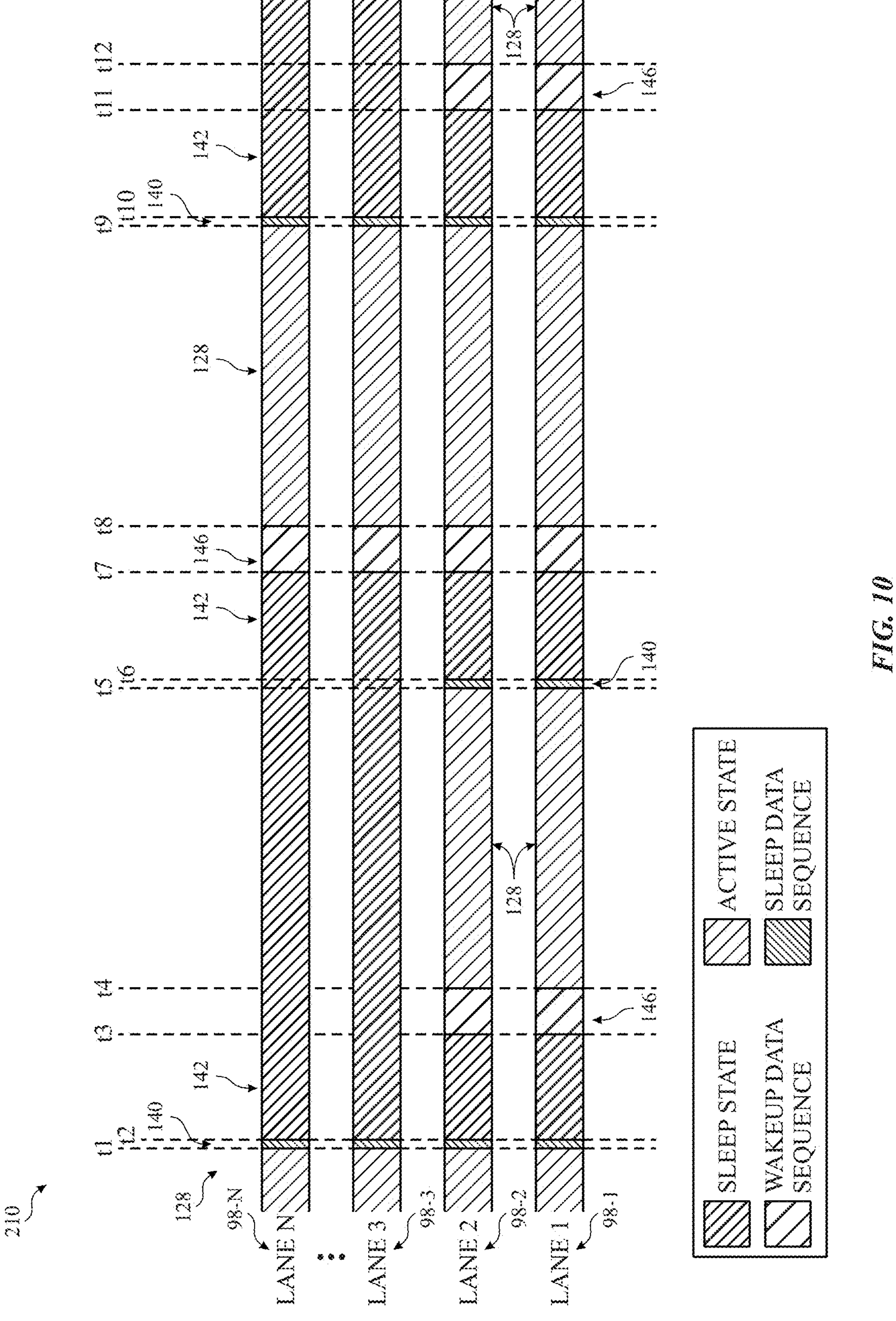
FIG. 10 is a data sequence diagram illustrating a global sleep state of the data links of the device interface of FIG. 6, according to embodiments of the present disclosure.

FIGS. 8-10 are related to adjusting the bandwidth and the power consumption of the device interface 80 described above. FIG. 8 is a flowchart of a state diagram 120 for adjusting the bandwidth and the power consumption of the device interface 80, according to embodiments of the present disclosure. Moreover, FIG. 9 is a data sequence diagram 190 illustrating per-lane power management of the data link 98-1 (e.g., lane 1) and the data link 98-2 (e.g., lane 2), according to embodiments of the present disclosure. Furthermore, FIG. 10 is a data sequence diagram 210 illustrating a global sleep state (e.g., a global power management scheme) of the data links 98-1 to 98-N (e.g., lanes 1 to N), according to embodiments of the present disclosure. FIGS. 8 and 9 may be described in relation to processes and states of the state diagram 120 of FIG. 8.

Referring now to FIG. 8, the state diagram 120 may be described with respect to peripheral device 12, the processor core complex 18, and the device interface 80 described above with respect to FIGS. 6 and 7. Any suitable device that may control components of the electronic device 10, such as the processor 82, the peripheral device 12, a controller, and/or state machine circuitry, may perform operations of the state diagram 120. In some embodiments, the processor 82 may generate instructions to set configuration register values of the processor control interface 88 to perform one or more of the operations of the state diagram 120 described herein.

In some embodiments, the operations of the state diagram 120 may be implemented by executing instructions stored in a tangible, non-transitory, computer-readable medium, such as the memory 20 or the storage device 22, using the peripheral device 12 and/or the processor 82. For example, the operations of the state diagram 120 may be performed at least in part by one or more software components, such as an operating system of the electronic device 10, one or more software applications of the electronic device 10, and the like. While the operations of the state diagram 120 are described using steps in a specific sequence, it should be understood that the present disclosure contemplates that the described steps may be performed in different sequences than the sequence illustrated and/or described, and certain described steps may be skipped or not performed altogether.

In state block 122, the device interface 80 is at the off state. In the off state, the transmission channels 90 and the reception channels 94 may be switched off. In some cases, an output voltage of the transmission channels 90-1 to 90-N may be zero, near zero, at a ground voltage of the electronic device 10 (e.g., a virtual zero voltage), near the ground voltage, or any other viable voltage level. Moreover, the low-frequency data receivers 104 and the high-frequency data receivers 102 of the reception channels 94 may be switched off and/or may not receive and/or monitor for input data.

When in state block 122, the processor 82 may receive or determine a first indication to switch on the device interface 80. The processor 82 may generate first instructions 124 to switch on the device interface 80 in response to the first indication. In some cases, the processor 82 may generate the first instructions 124 to switch on a subset of the data links 98. The processor 82 and/or the processor control interface 88 may provide the first instructions 124 and/or an indication (e.g., control signals) of the first instructions 124 directly and/or via any other viable circuit component to the transmitter 86 and/or the receiver 92. In FIG. 9, the data sequence diagram 190 may illustrate the off state of the state block 122 before time t1. For example, the transmitter 86 may not output the common-mode voltage and/or may not generate data at the off state.

Referring to FIG. 8, in process block 126, the transmitter 86 and the receiver 92 may perform data link initialization and link training to transition to the active state in response to the first instructions 124. The transmitter 86 may switch on the transmission channels 90 (or a subset of the transmission channels 90). The receiver 92 may switch on the high-frequency data receivers 102 and the low-frequency data receivers 104 of the reception channels 94 corresponding to the transmission channels 90 being activated. Moreover, the transmitter 86 may establish the data communication link with the receiver 92 during the data link initialization and link training.

In FIG. 9, the data sequence diagram 190 may illustrate the data link initialization and link training of the process block 126 between times t1 and t2. For example, the transmitter 86 may transmit one or more link training data sequences to establish the data communication link with the receiver 92. For example, the link training data sequences may be indicative of the number of active transmission channels 90, and/or parameters associated with a communication protocol, data transmission rate, and/or the common-mode voltage, among other things.

Referring back to FIG. 8, in the state block 128, the device interface 80 may be at the active state. In the active state, the transmission channels 90 may generate and/or output the data packet or the stream of multiple data packets to the respective reception channels 94. In some embodiments, the data packet or the stream of multiple data packets may include the payloads including the raw data and/or the desired data generated by the peripheral device 12. The peripheral device 12 may dynamically activate and deactivate a subset of the data links 98 when the device interface 80 is in the active state. In alternative or additional embodiments, the data packet or the stream of multiple data packets may include the payloads including the raw data and/or the desired data generated by the processor 82. The processor 82 may dynamically activate and deactivate a subset of the data links 98 when the device interface 80 is in the active state.

In FIG. 9, the data sequence diagram 190 may illustrate the active state of the state block 128 between t2 and t7, t10 and t15, and after t18 on the data link 98-1 (e.g., lane 1). Moreover, the data sequence diagram 190 may illustrate the active state of the state block 128 between t2 and t3, t6 and t7, t12 and t13, and after t18 on the data link 98-2 (e.g., lane 2). In FIG. 10, the data sequence diagram 210 may illustrate the active state of the state block 128 before t1, between t4 and t5, t8 and t9, and after t12 on the data links 98-1 and 98-2 (e.g., lanes 1 and 2). Moreover, the data sequence diagram 210 may illustrate the active state of the state block 128 before t1 and between t8 and t9 on the data links 98-1 to 98-N (e.g., lanes 1 to N). For example, the transmitter 86 may transmit the data packet or the stream of multiple data packets to the receiver 92 during the illustrated time periods associated with the active state via the respective data links 98.

Referring back to FIG. 8, the peripheral device 12 or the processor 82 of the processor core complex 18 may determine and/or receive a second indication to reduce the data bandwidth of the device interface 80 to reduce the power consumption of the electronic device 10. The peripheral device 12 or the processor 82 may determine and/or receive the second indication based on determining that the desired bandwidth for transmitting the data packets via the device interface 80 is lower than the data bandwidth of the active data links 98. Accordingly, the peripheral device 12 or the processor 82 may generate second instructions 130 to reduce a number of the active data links 98. For example, the peripheral device 12 may generate the second instructions 130 when the peripheral device 12 provides the data packet or the stream of multiple data packets. Moreover, the processor 82 may generate the second instructions 130 when the processor 82 provides the data packet or the stream of multiple data packets.

In process block 132, the transmitter 86 may deactivate one or more active transmission channels 90 and the receiver 92 may deactivate one or more respective active reception channels 94 in response to the second instructions 130. In some embodiments, the one or more active transmission channels 90 may generate the sleep data sequence to deactivate the respective reception channels 94 when being deactivated. The receiver 92 may deactivate the respective reception channels 94 in response to the second instructions 130, the sleep data sequences, or both.

In FIG. 9, the data sequence diagram 190 may illustrate the active data link count reduction of the per-lane power management (e.g., per-lane power reduction) associated with the process block 132 between times t3 and t4 and between t13 and t14 on the data link 98-2 (e.g., lane 2). Moreover, the data sequence diagram 190 may illustrate the active data link count reduction of the process block 132 between times t3 and t4 and between times t13 and t14 on the data link 98-2 (e.g., lane 2). For example, the respective transmission channels 90 (e.g., transmission channels 90-1 and 90-2) may transmit one or more sleep data sequences during the respective active data link count reductions to transition the respective reception channels 94 to the sleep state.

Upon return to the active state of the state block 128 of FIG. 8, the transmitter 86 may maintain the common-mode voltage of the deactivated transmission channels 90 while not transmitting data. For example, the deactivated transmission channels 90 may consume a reduced amount of electrical power compared to the active transmission channels 90. Moreover, the receiver 92 may switch off the respective high-frequency data receivers 102 of the deactivated reception channels 94. As such, the deactivated reception channels 94 may consume a reduced amount of electrical power compared to the active reception channels 94.

The low-frequency data receivers 104 may remain active during the sleep states to receive and/or monitor for subsequent wakeup data sequences. The remainder of the data links 98 may remain active and may transport data. As discussed above, the peripheral device 12, the processor 82, the transmitter 86, the receiver 92, or any combination thereof may deactivate the one or more transmission channels 90 and/or the respective reception channels 94. Accordingly, the bandwidth of the device interface 80 may be reduced to reduce the power consumption of the electronic device 10.

In some cases, the peripheral device 12 or the processor 82 of the processor core complex 18 may determine and/or receive a third indication to increase the bandwidth of the device interface 80. For example, the peripheral device 12 or the processor 82 may determine and/or receive the third indication based on determining that the desired bandwidth for transmitting the data packets via the device interface 80 is higher than a data bandwidth of the active data links 98. As such, the peripheral device 12 or the processor 82 may generate third instructions 134 to increase a number of the active data links 98. For example, the peripheral device 12 may generate the third instructions 134 when the peripheral device 12 provides the data packet or the stream of multiple data packets. Alternatively or additionally, the processor 82 may generate the third instructions 134 when the processor 82 provides the data packet or the stream of multiple data packets.

In process block 136, the transmitter 86 may activate one or more additional transmission channels 90 and the receiver 92 may activate one or more respective reception channels 94 in response to the third instructions 134. In some embodiments, the one or more additional transmission channels 90 may generate the wakeup data sequence to activate the respective reception channels 94 coupled thereto. In some embodiments, the transmission channels 90 may transmit data (e.g., continuously transmit data) when activated. The receiver 92 may activate the respective reception channels 94 in response to the third instructions 134, the wakeup data sequences, or both.

In FIG. 9, the data sequence diagram 190 may illustrate the active data link wake up of the data link 98-2 (e.g., a single data link, a desired number of data links 98) with the process block 136 between times t5 and t6 on (e.g., lane 1). Moreover, the data sequence diagram 190 may illustrate the active data link count increase of the process block 136 between times t11 and t12 on the data link 98-2 (e.g., lane 2). For example, the respective transmission channels 90

(e.g., transmission channels 90-1 and 90-2) may transmit one or more wakeup data sequences during the respective active data link count increase to transition the respective reception channels 94 to the active state.

Each transmission channel 90 may output the respective wakeup data sequences to activate a respective reception channel 94. In some cases, the transmission channel 90 may transmit the respective wakeup data sequences via the respective data lanes 96. In some embodiments, the peripheral device 12 or the processor 82 may provide an indication of a number of the reception channels 94 to be activated to the receiver 92 using a separate data packet (e.g., a designated data packet) via the respective data lanes 96. Alternatively or additionally, the peripheral device 12 or the processor 82 may provide an indication of a number of the reception channels 94 to be activated to the receiver 92 via the sideband channel 106.

Activating the respective reception channels 94 may include switching on the high-frequency data receivers 102 of the respective reception channels 94. One or more additional data links 98 may become activated based on activating the respective transmission channels 90 and reception channels 94. The activated transmission channels 90 may generate and/or output the data packet or the stream of multiple data packets along with streams of idle data to the respective reception channels 94. The data packet or the stream of multiple data packets may include the raw data of the peripheral device 12 or the processor 82.

The idle data may include predetermined data, such as streams of logical zeros, logical ones, or both. For example, the transmission channels 90 may output (e.g., periodically output) the streams of idle data to provide gaps between the data packets. In some cases, the transmission channels 90 may output the idle data based on the communication protocol, based on a predetermined amount of data output and/or time period, among other possibilities. In any case, a number of the active data links 98 is increased by activating one or more of the deactivated data links 98.

Referring back to FIG. 8, in some embodiments, the peripheral device 12 or the processor 82 of the processor core complex 18 may dynamically activate and deactivate the data links 98-1 to 98-N (e.g., the entirety of the data links 98). For example, the peripheral device 12 or the processor 82 may determine and/or receive a fourth indication to reduce the communication bandwidth of the device interface 80 when in the active state. In specific cases, the fourth indication may indicate a desired bandwidth of zero or near zero. For example, the peripheral device 12 or processor 82 may receive the fourth indication based on determining a data blank period of the peripheral device 12.

In some embodiments, the peripheral device 12 may not generate the raw data or may not have the raw data ready for transmission during the data blank period when the peripheral device 12 provides the data packet or the stream of multiple data packets. As such, the peripheral device 12 may generate fourth instructions 138 to deactivate the data links 98-1 to 98-N. In alternative or additional embodiments, the processor 82 may not generate the raw data or may not have the raw data ready for transmission during the data blank period when the processor 82 provides the data packet or the stream of multiple data packets. As such, the processor 82 may generate fourth instructions 138 to deactivate the data links 98-1 to 98-N.

In different cases, a different number of the data links 98-1 to 98-N may be activated when the peripheral device 12 or the processor 82 generate the fourth instructions 138. In process block 140, the transmitter 86 may deactivate the active transmission channels 90 (e.g., the entirety of the transmission channels 90-1 to 90-N) in response to the fourth instructions 138. Moreover, the receiver 92 may deactivate the active reception channels 94 (e.g., the entirety of the reception channels 94-1 to 94-N). For example, the receiver 92 may switch off the high-frequency data receivers 102. In some embodiments, the active transmission channels 90 of the active data links 98 may generate one or more sleep data sequences to deactivate the respective reception channels 94.

In FIG. 9, the data sequence diagram 190 may illustrate the data links deactivation (e.g., link power reduction) associated with the process block 140 between times t7 and t8 and between times t15 and t16 on the data links 98-1 and 98-2 (e.g., lanes 1 and 2). Moreover, in FIG. 10, the data sequence diagram 210 may illustrate the data links deactivation associated with the process block 140 between times t1 and t2 and between times t9 and t10 on the data links 98-1 to 98-N (e.g., lanes 1 to N). Furthermore, by way of example, the data sequence diagram 210 may illustrate deactivating the data links 98-1 and 98-2 associated with the process block 140 between times t5 and t6. In the aforementioned example, the data links 98-1 and 98-2 (e.g., lanes 1 and 2) may be activated and the data links 98-3 to 98-N (e.g., lanes 3 to N) may be deactivated when the peripheral device 12 or the processor 82 generate the fourth instructions 138. As mentioned above, in some cases, the transmission channels 90 may transmit one or more sleep data sequences during the data links deactivation to transition the respective reception channels 94 to the sleep state.

Referring back to FIG. 8, in state block 142, the device interface 80 may be in the sleep state. In the sleep state, the deactivated transmission channels 90 may maintain the common-mode voltage and/or an output impedance higher than that of activated transmission channels 90, for example, without transmitting data. Alternatively or additionally, in the sleep state, an output voltage of the transmission channels 90-1 to 90-N may be zero, near zero, at a ground voltage of the electronic device 10 (e.g., a virtual zero voltage), near the ground voltage, or any other viable voltage level. Moreover, the high-frequency data receivers 102 may be switched off in the sleep state. As such, the device interface 80 may consume a reduced amount of electrical power compared to when activated. The low-frequency data receivers 104 may remain active during the sleep state (e.g., global sleep state of the device interface 80) to receive and/or monitor for the subsequent wakeup data sequences.

In FIG. 9, the data sequence diagram 190 may illustrate the sleep state of the state block 142 between t8 and t9 and between t16 and t17. In FIG. 10, the data sequence diagram 210 may illustrate the sleep state of the state block 128 between t2 and t3, t6 and t7, and t10 and t11. For example, the transmitter 86 may maintain the common-mode voltage of the transmission channels 90-1 to 90-N and the receiver 92 may switch off the high-frequency data receivers 102-1 to 102-N.

When in the sleep state, in some cases, the peripheral device 12 or the processor 82 may determine and/or receive a fifth indication to increase the data bandwidth of the device interface 80. For example, the peripheral device 12 or the processor 82 may determine and/or receive the fifth indication based on determining an end of the data blank period of the peripheral device 12, as will be appreciated. As such, the peripheral device 12 or the processor 82 may generate fifth instructions 144 to activate a number of the data links 98.

For example, the peripheral device 12 may generate the fifth instructions 144 when the peripheral device 12 provides the data packet or the stream of multiple data packets. Alternatively or additionally, the processor 82 may generate the fifth instructions 144 when the processor 82 provides the data packet or the stream of multiple data packets. In some cases, the transmission channels 90 and the reception channels 94 may receive and/or detect the fifth instructions 144 when deactivated in the sleep state. In specific cases, the transmission channels 90 and/or the reception channels 94 may receive and/or detect the fifth instructions 144 to reduce, increase, or maintain a total number of the data links 98 to be activated compared to before transitioning to the sleep state, for example, for dynamic bandwidth management.

Referring back to FIG. 8, in process block 146, the transmitter 86 may activate one or more transmission channels 90 in response to the fifth instructions 144. The one or more transmission channels 90 may generate the wakeup data sequence to activate the respective reception channels 94 coupled thereto. In some embodiments, the transmission channels 90 may transmit data (e.g., continuously transmit data) when activated.

In FIG. 9, the data sequence diagram 190 may illustrate the data links activation (e.g., the dynamic bandwidth management) associated with the process block 146 between times t9 and t10 and between times t17 and t18 on the data links 98-1 and 98-2 (e.g., lanes 1 and 2). Moreover, in FIG. 10, the data sequence diagram 210 may illustrate the data links activation associated with the process block 146 between times t3 and t4 and between times t11 and t12 on the data links 98-1 and 98-2 (e.g., lanes 1 and 2). For example, the peripheral device 12 or the processor 82 of the processor core complex 18 may generate the fifth instructions 144 indicative of activating two (or any other desired number) of the data links 98. As such, the transmitter 86 may activate the transmission channels 90-1 and 90-2. Moreover, the transmitter 86 may generate the one or more wakeup data sequences between times t3 and t4 and between times t11 and t12.

Furthermore, the data sequence diagram 210 may illustrate activating the data links 98-1 to 98-N associated with the process block 146 between times t7 and t8. For example, the peripheral device 12 or the processor 82 may generate the fifth instructions 144 indicative of activating all of the data links 98. As such, the transmitter 86 may activate the transmission channels 90-1 to 90-N. Moreover, the transmitter 86 may generate the one or more wakeup data sequences between times t7 and t8.

The low-frequency data receivers 104 of the one or more reception channels 94 may receive and/or detect the wakeup data sequences. The reception channels 94 may turn on the respective high-frequency data receivers 102 in response to the wakeup data sequences. As such, one or more data links 98 may become activated to transport the data packet or the stream of multiple data packets. Accordingly, the device interface 80 may return to the active state by activating the desired number of the data links 98.

When in the sleep state, in alternative or additional cases, the processor 82 may determine and/or receive a sixth indication to further reduce the power consumption of the device interface 80. For example, the processor 82 may receive the sixth indication based on determining that the data blank period of the peripheral device 12 or the processor 82 is longer than a threshold amount of time. In some cases, the threshold for the data blank period may be equal to or above 0.1 Nano-second (ns), 0.12 ns, 0.4 ns, 0.7 ns, 7 ns, 30 ns, 145 ns, 1 milli-second, and so on, among other possibilities. As such, the processor 82 may generate sixth instructions 148 to transition the data links 98-1 to 98-N to the deep sleep state.

In process block 150, the transmitter 86 may switch off the transmission channels 90 (e.g., the deactivated transmission channels 90-1 to 90-N). Moreover, the receiver 92 may switch off the low-frequency data receivers 104 of the reception channels 94 (e.g., the deactivated reception channels 94-1 to 94-N). As such, the power consumption of the device interface 80 may be further reduced.

The processor 82 may generate seventh instructions 152 to return the device interface 80 to the sleep state at the state block 142. In some cases, the processor 82 may generate the seventh instructions 152 based on determining and/or receiving a seventh indication to return the device interface 80 to the sleep state. As such, the transmitter 86 may switch on the transmission channels 90 by maintaining the common-mode voltage and the receiver 92 may switch on the low-frequency data receivers 104 of the reception channels 94.

Figure 11:
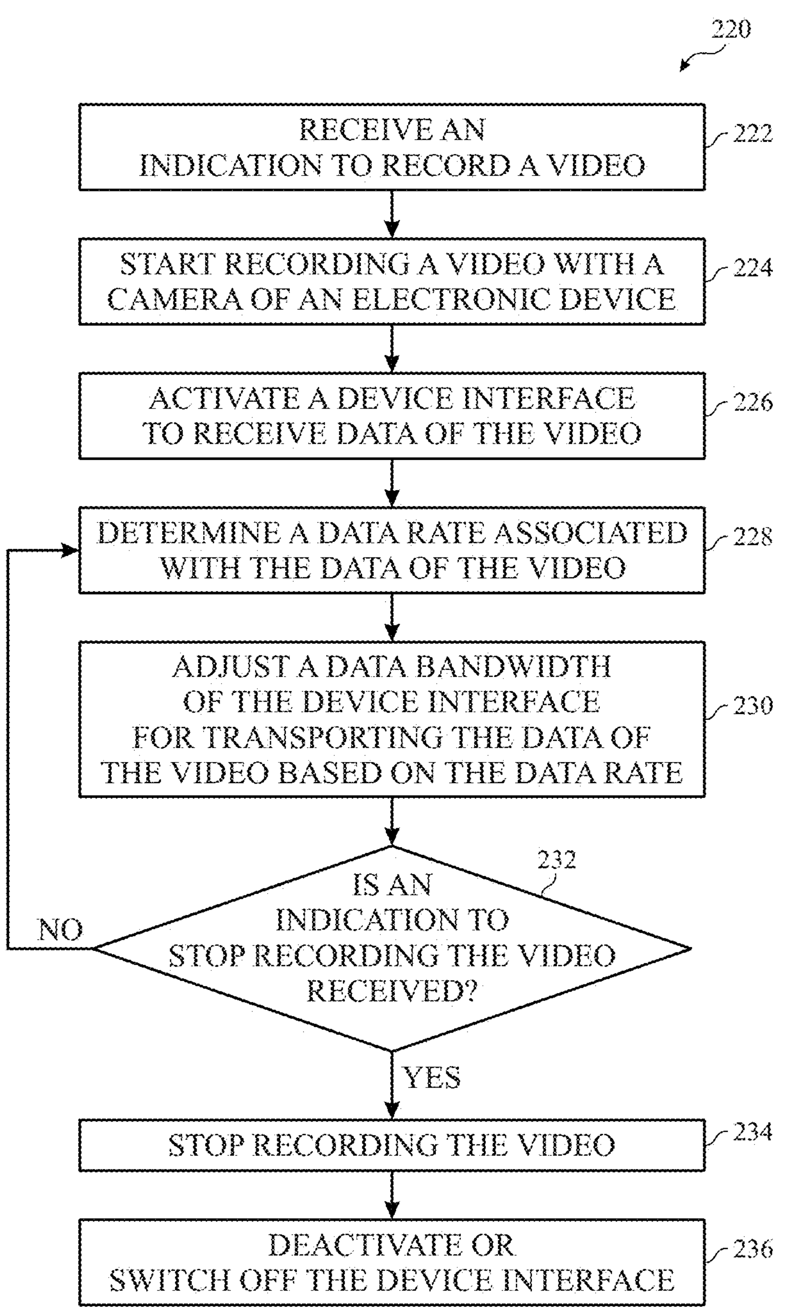
FIG. 11 is a flowchart of a method for the electronic device to manage data bandwidth of the device interface of FIGS. 6 and 8-10 by the peripheral device, according to embodiments of the present disclosure.

FIG. 11 is a flowchart of a method 220 for the electronic device 10 to manage communication bandwidth of the device interface 80 by the peripheral device 12, according to embodiments of the present disclosure. Any suitable device (e.g., a controller) that may control components of the electronic device 10, such as the processor core complex 18 and/or the peripheral device 12, may perform the method 220. In some embodiments, the method 220 may be implemented by executing instructions stored in a tangible, non-transitory, computer-readable medium, such as the memory 20 or storage device 22, using the processor core complex 18 and/or the peripheral device 12. For example, the method 220 may be performed at least in part by one or more software components, such as an operating system of the electronic device 10, one or more software applications of the electronic device 10, and the like. While the method 220 is described using steps in a specific sequence, it should be understood that the present disclosure contemplates that the described steps may be performed in different sequences than the sequence illustrated, and certain described steps may be skipped or not performed altogether.

In process block 222, the processor 82 receives an indication to record a video (or capture one or more images). The processor 82 may receive the indication from the input devices 14, the memory 20 and/or the storage device 22, the antennas 30, among other things described above with respect to FIG. 1, or any other viable component or circuitry. Alternatively or additionally, the processor 82 may determine the indication, for example, based on a triggering event, a time event, a time threshold, among other things. For example, a user may press a record button of the electronic device 10 to record the video.

In process block 224, the processor 82 starts recording a video with the camera 31 of the electronic device 10. The peripheral device 12 discussed above may include the camera 31. In some embodiments, the processor 82 may generate instructions to set or reset one or more values of the configuration registers of the processor control interface 88 to start recording the video by the camera 31. In alternative or additional embodiments, the processor 82 may provide the instructions directly or via any other viable circuitry to the camera 31 to start recording the video.

In process block 226, the processor 82 activates the device interface 80 to receive the data (e.g., raw data, image data) of the video. In some embodiments, the processor 82 may generate instructions to set or reset one or more values of the configuration registers of the processor control interface 88 to activate the device interface 80. In alternative or additional embodiments, the processor 82 may provide the instructions directly or via any other viable circuitry to the transmitter 86 and/or receiver 92 to activate the device interface 80. In some cases, the transmitter 86 and the receiver 92 may perform data link initialization and link training to transition to the active state in response to the processor instructions as described above with respect to the process block 126 of FIG. 8.

In process block 228, the peripheral device 12 determines a data rate of the data of the video. The data rate may correspond to a rate of generating and/or outputting the data by the peripheral device 12. The data rate may be determined based on a resolution of the camera 31, a scale of frames of the video, refresh rates of the video, blank periods of the video, or any combination thereof, among other possibilities. In some cases, the device interface 80 may be in the active state of the state block 128 of FIG. 8 discussed above.

In process block 230, the peripheral device 12 adjusts a data bandwidth of the device interface 80 for transporting the data of the video based on the determined data rate. The peripheral device 12 may reduce a number of the active data links 98 as discussed above with respect to process block 132 of FIG. 8 when the data rate is associated with a desired bandwidth lower than a current bandwidth of the device interface 80. The peripheral device 12 may increase a number of the active data links 98 as discussed above with respect to process block 136 of FIG. 8 when the data rate is associated with a desired bandwidth higher than the current bandwidth of the device interface 80.

Alternatively or additionally, the peripheral device 12 may deactivate the data links 98 (e.g., the entirety of the data links 98-1 to 98-N) and activate (e.g., reactivate) a desired number of the data links 98 based on the desired bandwidth. Such operations may be discussed above with respect to the process blocks 140 and 146 and the state block 142 of FIG. 8. For example, the peripheral device 12 may activate an increased or decreased number of the data links 98 after the sleep state of the state block 142 compared to the number of activated data links 98 in the active state of the state block 128 before being deactivated by the process block 140 of FIG. 8.

In some embodiments, the peripheral device 12 may switch between activating (e.g., reactivate) different numbers of the data links 98 when switching between the sleep state of the state block 142 and the active state of the state block 128. By way of example, the peripheral device 12 may consecutively switch to the active state by activating a first number of the data links 98 (e.g., the entirety of the data links 98-1 to 98-N), switch to the sleep state, switch to the active state by activating a second number of the data links 98 (e.g., the data links 98-1 and 98-2), and switch to the sleep state, as illustrated by the data sequence diagram 210 of FIG. 10.

It should be appreciated that in alternative or additional cases, the peripheral device 12 may perform the above mentioned operations consecutively, based on various timing delays and/or parameters, and/or based on various triggering events. Moreover, in different cases, the peripheral device 12 may switch between different number of active data links 98 (e.g., the per-lane power management), may (or may not) switch to the sleep state (e.g., the global sleep state) based on any viable schedule, and may activate (e.g., reactivate) a different number of the data links after each sleep state, or any combination thereof, to adjust the bandwidth of the device interface 80.

In process block 232, the processor 82 determines whether an indication to stop recording the video is received. The processor 82 may receive the indication from the input devices 14, the memory 20 and/or the storage device 22, the antennas 30, among other things described above with respect to FIG. 1, or any other viable component or circuitry. When such indication is received (or determined), the processor 82 and/or the peripheral device 12 move to the operation of process block 234. Alternatively, the peripheral device 12 determines a data rate associated with the data of the video at process block 228, and adjusts a data bandwidth of the device interface 80 for transporting the data of the image or video based on the determined data rate at process block 230. In different embodiments, the processor 82 may return to the process blocks 228 and 230 at different time intervals or at or after a different process block.

In process block 234, the processor 82 stops recording of the video. In some embodiments, the processor 82 may generate instructions to set or reset one or more values of the configuration registers of the processor control interface 88 to stop recording the video by the camera 31. In alternative or additional embodiments, the processor 82 may provide the instructions directly or via any other viable circuitry to the camera 31 to stop recording the video.

In process block 236, the processor 82 deactivates (or switches off) the device interface 80. In some embodiments, the processor 82 may generate instructions to set or reset one or more values of the configuration registers of the processor control interface 88 to deactivate or switch off the device interface 80. In alternative or additional embodiments, the processor 82 may provide the instructions directly or via any other viable circuitry to the transmitter 86 and/or receiver 92 to deactivate or switch off the device interface 80.

Figure 12:
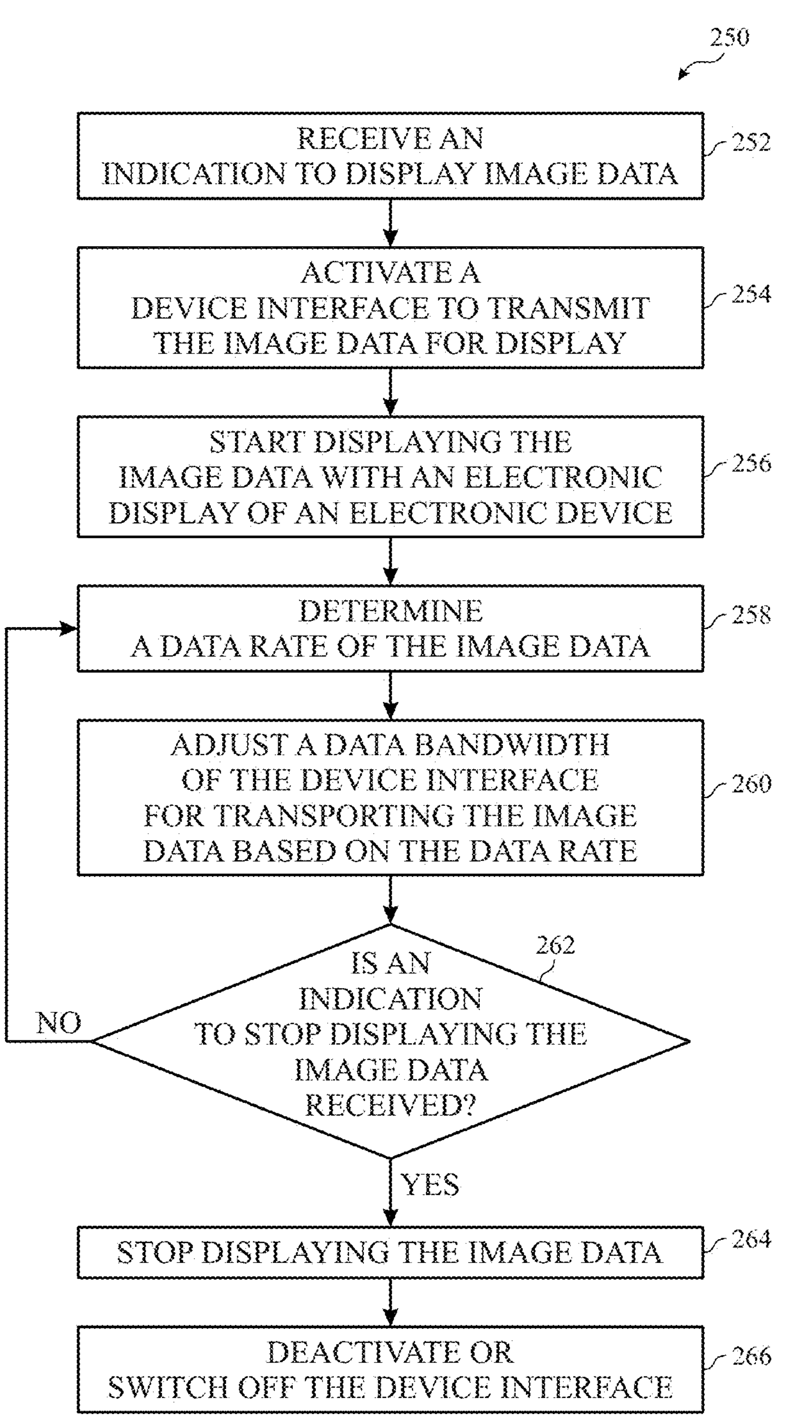
FIG. 12 is a flowchart of a method for the electronic device to manage data bandwidth of the device interface of FIGS. 7-10 by the processor of the processor core complex, according to embodiments of the present disclosure.

FIG. 12 is a flowchart of a method 250 for the electronic device 10 to manage communication bandwidth of the device interface 80 by the processor 82, according to embodiments of the present disclosure. Any suitable device (e.g., a controller) that may control components of the electronic device 10, such as the processor core complex 18 and/or the peripheral device 12, may perform the method 250. In some embodiments, the method 250 may be implemented by executing instructions stored in a tangible, non-transitory, computer-readable medium, such as the memory 20 or storage device 22, using the processor core complex 18 and/or the peripheral device 12. For example, the method 250 may be performed at least in part by one or more software components, such as an operating system of the electronic device 10, one or more software applications of the electronic device 10, and the like. While the method 250 is described using steps in a specific sequence, it should be understood that the present disclosure contemplates that the described steps may be performed in different sequences than the sequence illustrated, and certain described steps may be skipped or not performed altogether.

In process block 252, the processor 82 receives an indication to display image data. The processor 82 may receive the indication from the input devices 14, the memory 20 and/or the storage device 22, the antennas 30, among other things described above with respect to FIG. 1, or any other viable component or circuitry. Alternatively or additionally, the processor 82 may determine the indication, for example, based on a triggering event, a time event, a time threshold, among other things. For example, a user may provide the indication to record the video.

In process block 254, the processor 82 activates the device interface 80 to transmit the image data (e.g., raw data). The image data may be associated with an image and/or a video, among other possibilities. In some embodiments, the processor 82 may generate instructions to set or reset one or more values of the configuration registers of the processor control interface 88 to activate the device interface 80. In alternative or additional embodiments, the processor 82 may provide the instructions directly or via any other viable circuitry to the transmitter 86 and/or receiver 92 to activate the device interface 80. In some cases, the transmitter 86 and the receiver 92 may perform data link initialization and link training to transition to the active state in response to the processor instructions as described above with respect to the process block 126 of FIG. 8.

In process block 256, the processor 82 starts displaying the image data with the electronic display 28 of the electronic device 10. The peripheral device 12 discussed above may include the camera 31. In some embodiments, the processor 82 may generate instructions to set or reset one or more values of the configuration registers of the processor control interface 88 to start displaying the image data by the electronic display 28. In alternative or additional embodiments, the processor 82 may provide the instructions directly or via any other viable circuitry to the electronic display 28 to start recording the video.

In process block 258, the processor 82 determines a data rate of the image data. The data rate may correspond to a rate of generating and/or outputting the image data by the processor 82. The data rate may be determined based on specification of the electronic display 28, a scale of frames of the image or video, refresh rates of the image or video, blank periods of the image or video, or any combination thereof, among other possibilities. In some cases, the device interface 80 may be in the active state of the state block 128 of FIG. 8 discussed above.

In process block 260, the processor 82 adjusts a data bandwidth of the device interface 80 for transporting the image data based on the determined data rate. The processor 82 may reduce a number of the active data links 98 as discussed above with respect to process block 132 of FIG. 8 when the data rate is associated with a desired bandwidth lower than a current bandwidth of the device interface 80. The processor 82 may increase a number of the active data links 98 as discussed above with respect to process block 136 of FIG. 8 when the data rate is associated with a desired bandwidth higher than the current bandwidth of the device interface 80.

Alternatively or additionally, the processor 82 may deactivate the data links 98 (e.g., the entirety of the data links 98-1 to 98-N) and activate (e.g., reactivate) a desired number of the data links 98 based on the desired bandwidth. Such operations may be discussed above with respect to the process blocks 140 and 146 and the state block 142 of FIG. 8. For example, the processor 82 may activate an increased or decreased number of the data links 98 after the sleep state of the state block 142 compared to the number of activated data links 98 in the active state of the state block 128 before being deactivated by the process block 140 of FIG. 8.

In some embodiments, the processor 82 may switch between activating (e.g., reactivate) different numbers of the data links 98 when switching between the sleep state of the state block 142 and the active state of the state block 128. By way of example, the processor 82 may consecutively switch to the active state by activating a first number of the data links 98 (e.g., the entirety of the data links 98-1 to 98-N), switch to the sleep state, switch to the active state by activating a second number of the data links 98 (e.g., the data links 98-1 and 98-2), and switch to the sleep state, as illustrated by the data sequence diagram 210 of FIG. 10.

It should be appreciated that in alternative or additional cases, the processor 82 may perform the above mentioned operations consecutively, based on various timing delays and/or parameters, and/or based on various triggering events. Moreover, in different cases, the processor 82 may switch between different number of active data links 98 (e.g., the per-lane power management), may (or may not) switch to the sleep state (e.g., the global sleep state) based on any viable schedule, and may activate (e.g., reactivate) a different number of the data links after each sleep state, or any combination thereof, to adjust the bandwidth of the device interface 80.

In process block 262, the processor 82 determines whether an indication to stop displaying the image data is received. The processor 82 may receive the indication from the input devices 14, the memory 20 and/or the storage device 22, the antennas 30, among other things described above with respect to FIG. 1, or any other viable component or circuitry. When such indication is received (or determined), the processor 82 and/or the peripheral device 12 move to the operation of process block 264. Alternatively, the processor 82 determines a data rate associated with the image data at process block 258, and adjusts a data bandwidth of the device interface 80 for transporting the image data based on the determined data rate at process block 260. In different embodiments, the processor 82 may return to the process blocks 258 and 260 at different time intervals or at or after a different process block.

In process block 264, the processor 82 stops displaying the image data. In some embodiments, the processor 82 may generate instructions to set or reset one or more values of the configuration registers of the processor control interface 88 to stop displaying the image data by the electronic display 28. In alternative or additional embodiments, the processor 82 may provide the instructions directly or via any other viable circuitry to the electronic display 28 to stop displaying the image data.

In process block 266, the processor 82 deactivates (or switches off) the device interface 80. In some embodiments, the processor 82 may generate instructions to set or reset one or more values of the configuration registers of the processor control interface 88 to deactivate or switch off the device interface 80. In alternative or additional embodiments, the processor 82 may provide the instructions directly or via any other viable circuitry to the transmitter 86 and/or receiver 92 to deactivate or switch off the device interface 80.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A device interface comprising:

a receiver comprising a plurality of reception channels; and a transmitter comprising a plurality of transmission channels, wherein each transmission channel of the plurality of transmission channels is coupled to a respective reception channel of the plurality of reception channels, wherein the transmitter is configured to:

deactivate, based on one or more control signals, at least a first transmission channel of the plurality of transmission channels from an activated state to a deactivated state while at least a second transmission channel of the plurality of transmission channels remains in the activated state; and activate, based on the one or more control signals, at least the first transmission channel from the deactivated state to the activated state while the second transmission channel remains in the activated state, wherein each transmission channel of the plurality of transmission channels in the activated state is configured to transmit data while another transmission channel of the plurality of transmission channels changes from the activated state to the deactivated state or from the deactivated state to the activated state.

2. The device interface of claim 1, wherein:

a processor core complex comprises the transmitter, wherein the transmitter is configured to deactivate or activate the first transmission channel based on receiving the one or more control signals from the processor core complex, wherein deactivating and activating the first transmission channel are based on a desired bandwidth of the device interface for transporting data output from the processor core complex; or a peripheral device comprises the transmitter, wherein the transmitter is configured to deactivate or activate the first transmission channel based on receiving the one or more control signals from the peripheral device, wherein deactivating and activating the first transmission channel are based on the desired bandwidth of the device interface for transporting data output from the peripheral device.

3. The device interface of claim 2, wherein:

the processor core complex is configured to generate the one or more control signals; or the peripheral device is configured to generate the one or more control signals.

4. The device interface of claim 3, wherein:

the processor core complex is configured to provide the one or more control signals via a sideband channel to the receiver; or the peripheral device is configured to provide the one or more control signals via the sideband channel to the receiver.

5. The device interface of claim 3, wherein the transmitter is configured to provide an indication of the one or more control signals to the receiver with a designated data packet before transmitting a sleep data sequence, provide the one or more control signals to the receiver as part of the sleep data sequence, or provide the one or more control signals to the receiver as part of a wakeup data sequence.

6. The device interface of claim 1, wherein the transmitter is configured to:

transmit a sleep data sequence to deactivate at least one of the plurality of reception channels, wherein the receiver is configured to deactivate at least a first reception channel of the plurality of reception channels based on the sleep data sequence, wherein the first reception channel is coupled to the first transmission channel; and transmit a wakeup data sequence to activate at least one of the plurality of reception channels, wherein the receiver is configured to activate at least the first reception channel based on the wakeup data sequence.

7. The device interface of claim 1, wherein the transmitter is configured to activate the first transmission channel after deactivating the first transmission channel while the second transmission channel remains activated, or activate a third transmission channel after activating the first transmission channel while the second transmission channel remains activated.

8. The device interface of claim 1, wherein the one or more control signals are based on a data rate or image data generated by a camera, and wherein the data rate is determined based on a resolution associated with the camera, a scale or frames associated with the image data, one or more blank periods associated with the image data, or any combination thereof.

9. A device interface comprising:

a transmitter comprising a plurality of transmission channels; and a receiver comprising a plurality of reception channels, wherein each reception channel of the plurality of reception channels is coupled to a respective transmission channel of the plurality of transmission channels, wherein the transmitter is configured to:

cause, based on sending a first control signal to a first reception channel of the plurality of reception channels, deactivation of the first reception channel from an activated state to a deactivated state while a second reception channel of the plurality of reception channels remains in the activated state; and cause, based on sending a second control signal to the first reception channel, activation of the first reception channel from the deactivated state to the activated state while the second reception channel remains in the activated state, wherein each reception channel of the plurality of reception channels in the activated state is configured to receive data while another reception channel of the plurality of reception channels changes from the activated state to the deactivated state or from the deactivated state to the activated state.

10. The device interface of claim 9, wherein each of the plurality of reception channels comprises a first data receiver and a second data receiver, wherein the second data receiver of each of the plurality of reception channels is configured to receive data with a higher frequency compared to a respective first data receiver, wherein the receiver is configured to:

switch on the first data receiver of the first reception channel based on receiving the first control signal, wherein the first reception channel is configured to change from the activated state to the deactivated state based on the first control signal; and switch on the second data receiver of the first reception channel based on receiving the second control signal, wherein the first reception channel is configured to change from the deactivated state to the activated state based on the second control signal.

11. The device interface of claim 9, wherein:

a processor core complex comprises the receiver and a peripheral device comprises the transmitter, wherein the receiver is configured to deactivate the first reception channel based on receiving the first control signal from the peripheral device and to activate the first reception channel based on receiving the second control signal from the peripheral device, wherein deactivating and activating the first reception channel is based on a desired bandwidth of the device interface for transporting data output from the peripheral device; or the peripheral device comprises the receiver and the processor core complex comprises the transmitter, wherein the receiver is configured to deactivate the first reception channel based on receiving the first control signal from the processor core complex and to activate the first reception channel based on receiving the second control signal from the processor core complex, wherein deactivating and activating the first reception channel is based on the desired bandwidth of the device interface for transporting data output from the processor core complex.

12. The device interface of claim 11, wherein:

the processor core complex is configured to receive the first control signal or the second control signal; or the peripheral device is configured to receive the first control signal or the second control signal.

13. The device interface of claim 12, wherein:

the processor core complex is configured to receive the first control signal or the second control signal via a sideband channel from the peripheral device; or the peripheral device is configured to receive the first control signal or the second control signal via the sideband channel from the processor core complex.

14. The device interface of claim 12, wherein the receiver is configured to receive an indication of the first control signal or the second control signal with a designated data packet before receiving a sleep data sequence, receive the first control signal or the second control signal as part of the sleep data sequence, or receive the first control signal or the second control signal as part of a wakeup data sequence.

15. The device interface of claim 9, wherein the first control signal and the second control signal are to be based on a respective data rate or respective image data generated by a camera, and wherein the respective data rate is to be determined based on a resolution associated with the camera, a scale or frames associated with the respective image data, one or more blank periods associated with the respective image data, or any combination thereof.

16. An electronic device comprising:

a processor core complex;

a camera; and a device interface coupled to the processor core complex and the camera, wherein the device interface comprises a plurality of data links configured to communicate, based on a data rate, image data generated by the camera, and, wherein the device interface is configured to:

deactivate, based on one or more control signals, a first data link of the plurality of data links from an activated state to a deactivated state while a second data link of the plurality of data links remains in the activated state; and activate, based on the one or more control signals, the first data link from the deactivated state the activated state while the second data link remains in the activated state.

17. The electronic device of claim 16, wherein:

the device interface is configured to deactivate or activate the first data link based on receiving the one or more control signals from the processor core complex, wherein deactivating and activating the first data link is based on a desired bandwidth of the device interface for transporting data output from the processor core complex; or the device interface is configured to deactivate or activate the first data link based on receiving the one or more control signals from the camera, wherein deactivating and activating the first data link is based on the desired bandwidth of the device interface for transporting data output from the camera.

18. The electronic device of claim 16, wherein each data link of the plurality of data links comprises a respective transmission channel and a respective reception channel, wherein a reception channel of the first data link comprises a first data receiver and a second data receiver, wherein the second data receiver is configured to receive data with a higher frequency compared to the first data receiver, wherein the first data link is configured to:

switch on the first data receiver of the reception channel based on the one or more control signals, wherein the reception channel is configured to change from the activated state to the deactivated state based on the one or more control signals; and switch on the second data receiver of the reception channel based on the one or more control signals, wherein the reception channel is configured to change from the deactivated state to the activated state based on the one or more control signals.

19. The electronic device of claim 16, wherein:

the device interface is configured to deactivate or activate the first data link based on receiving the one or more control signals from the processor core complex, wherein the processor core complex is configured to generate the one or more control signals; or the device interface is configured to deactivate or activate the first data link based on receiving the one or more control signals from the camera, wherein the camera is configured to generate the one or more control signals.

20. The electronic device of claim 16, wherein each data link of the plurality of data links comprises a respective transmission channel and a respective reception channel, wherein:

the respective transmission channel of each of the plurality of data links is coupled to the processor core complex and the respective reception channel of each of the plurality of data links is coupled to the camera; or the respective transmission channel of each of the plurality of data links is coupled to the camera and the respective reception channel of each of the plurality of data links is coupled to the processor core complex.

* * * * *